(12) United States Patent
Aleem et al.

(10) Patent No.: US 10,579,141 B2
(45) Date of Patent: Mar. 3, 2020

(54) DYNAMIC CALIBRATION METHODS FOR EYE TRACKING SYSTEMS OF WEARABLE HEADS-UP DISPLAYS

(71) Applicant: North Inc., Kitchener (CA)

(72) Inventors: Idris S. Aleem, Kitchener (CA); Mayank Bhargava, Waterloo (CA); Dylan Jacobs, Kitchener (CA)

(73) Assignee: North Inc., Kitchener, ON (CA)

( * ) Notice: Subject to any disclaimer, the term of this patent is extended or adjusted under 35 U.S.C. 154(b) by 0 days.

(21) Appl. No.: 16/036,536

(22) Filed: Jul. 16, 2018

(65) Prior Publication Data

US 2019/0018482 A1   Jan. 17, 2019

Related U.S. Application Data

(60) Provisional application No. 62/533,463, filed on Jul. 17, 2017.

(51) Int. Cl.
| | |
|---|---|
| *G06F 3/01* | (2006.01) |
| *G02B 27/01* | (2006.01) |
| *G02B 27/00* | (2006.01) |
| *G09G 5/37* | (2006.01) |
| *G06T 13/80* | (2011.01) |

(52) U.S. Cl.
CPC ......... *G06F 3/013* (2013.01); *G02B 27/0093* (2013.01); *G02B 27/0172* (2013.01); *G02B 27/0179* (2013.01); *G02B 2027/014* (2013.01); *G02B 2027/0174* (2013.01); *G02B 2027/0178* (2013.01); *G02B 2027/0187* (2013.01); *G06T 13/80* (2013.01); *G09G 5/37* (2013.01); *G09G 2340/0464* (2013.01); *G09G 2354/00* (2013.01)

(58) Field of Classification Search
CPC ........ G02B 2027/014; G02B 2027/017; G02B 2027/0178
See application file for complete search history.

(56) References Cited

U.S. PATENT DOCUMENTS

| | | | |
|---|---|---|---|
| 2016/0235323 A1* | 8/2016 | Tadi | A61B 5/7285 |
| 2016/0358181 A1* | 12/2016 | Bradski | G06Q 20/40145 |
| 2018/0149874 A1* | 5/2018 | Aleem | G02B 26/101 |
| 2018/0239430 A1* | 8/2018 | Tadi | G02B 27/0172 |
| 2019/0018482 A1* | 1/2019 | Aleem | G06F 3/147 |
| 2019/0018483 A1* | 1/2019 | Aleem | G06F 3/147 |

\* cited by examiner

*Primary Examiner* — Chun-Nan Lin
(74) *Attorney, Agent, or Firm* — Thomas Mahon

(57) ABSTRACT

Systems, methods and articles that provide dynamic calibration of eye tracking systems for wearable heads-up displays (WHUDs). The eye tracking system may determine a user's gaze location on a display of the WHUD utilizing a calibration point model that includes a plurality of calibration points. During regular use of the WHUD by the user, the calibration point model may be dynamically updated based on the user's interaction with user interface (UI) elements presented on the display. The UI elements may be specifically designed (e.g., shaped, positioned, displaced) to provide in-use and on-going dynamic calibration of the eye tracking system, which in at least some implementations may be unnoticeable to the user.

20 Claims, 8 Drawing Sheets

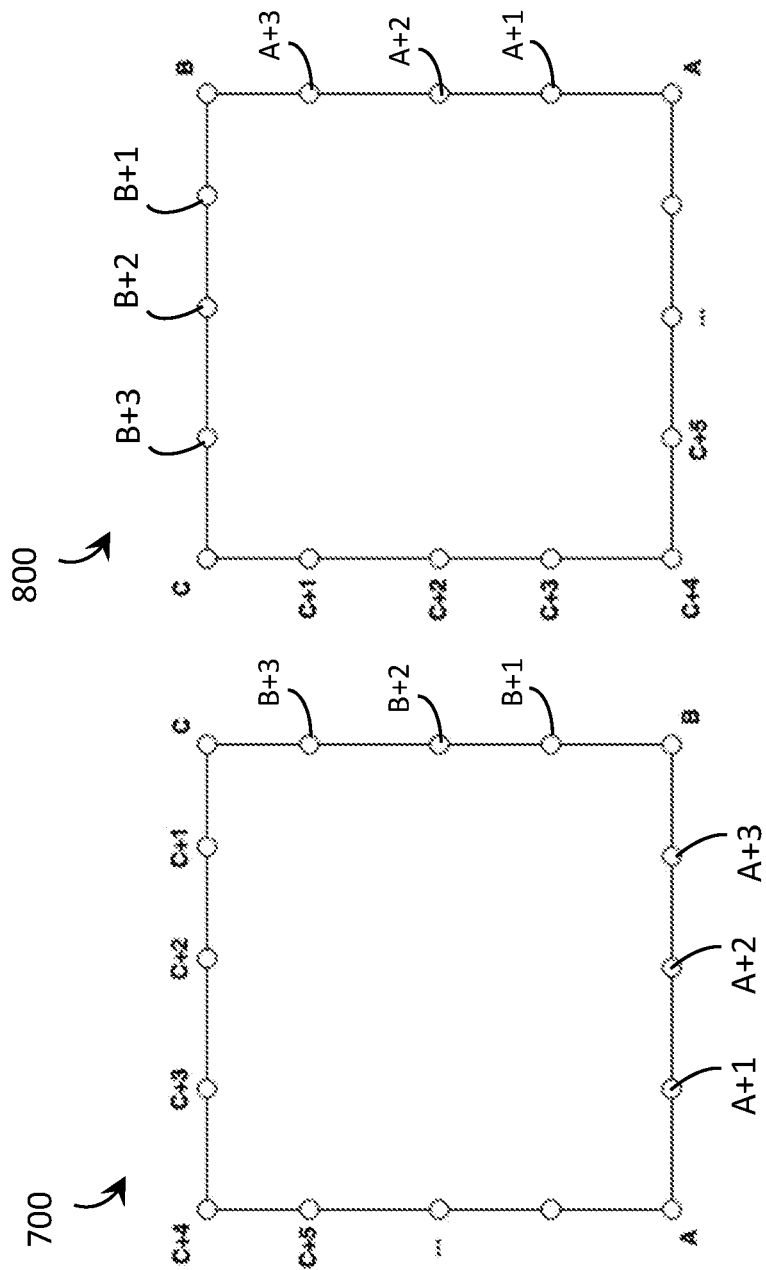

DYNAMIC CALIBRATION METHODS FOR EYE TRACKING SYSTEMS OF WEARABLE HEADS-UP DISPLAYS

BACKGROUND

Technical Field

The present disclosure generally relates to wearable heads-up displays, and more particularly, to calibration systems and methods for eye tracking systems of wearable heads-up displays.

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus while still providing displayed content with sufficient visual quality. There is a need in the art for wearable heads-up displays of more aesthetically-appealing design that are capable of providing high-quality images to the user without limiting the user's ability to see their external environment.

Eye Tracking

Eye tracking is a process by which the position, orientation, and/or motion of the eye may be measured, detected, sensed, determined (collectively, "measured"), and/or monitored. In many applications, this is done with a view towards determining the gaze direction of a user. The position, orientation, and/or motion of the eye may be measured in a variety of different ways, the least invasive of which typically employ one or more optical sensor(s) (e.g., cameras) to optically track the eye. Common techniques involve illuminating or flooding the entire eye, all at once, with infrared light and measuring reflections with at least one optical sensor that is tuned to be sensitive to the infrared light. Information about how the infrared light is reflected from the eye is analyzed to determine the position(s), orientation(s), and/or motion(s) of one or more eye feature(s) such as the cornea, pupil, iris, and/or retinal blood vessels.

Eye tracking functionality is highly advantageous in applications of wearable heads-up displays. Some examples of the utility of eye tracking in wearable heads-up displays include: influencing where content is displayed in the user's field of view, conserving power by not displaying content that is outside of the user's field of view, influencing what content is displayed to the user, determining where the user is looking or gazing, determining whether the user is looking at displayed content on the display or through the display at their external environment, and providing a means through which the user may control/interact with displayed content.

BRIEF SUMMARY

A method of operating a wearable heads-up display device (WHUD) comprising a display and a glint detection module may be summarized as including during regular operation of the WHUD by a user, populating, by at least one processor, the display of the WHUD with at least one user interface (UI) element; and detecting, by the at least one processor, a gaze location of a user based at least in part on glint information received from the glint detection module and a known location of at least one of the at least one UI element on the display. Populating the display of the WHUD with at least one UI element may include populating the display with a number of UI elements that is below a threshold determined to enable accurate gaze location detection. Populating the display of the WHUD with at least one UI element may include maximizing the respective distances between a plurality of UI elements displayed on the display. Populating the display of the WHUD with at least one UI element may include minimizing a similarity between an angle and a length of vectors that join pairs of a plurality of UI elements displayed on the display. Populating the display of the WHUD with at least one UI element may include populating the display of the WHUD with at least one animated UI element.

The method may further include updating, by the at least one processor, an eye tracking calibration based at least in part on the detected gaze location. Updating an eye tracking calibration may include generating at least one calibration point based at least in part on the detected gaze location, the at least one calibration point including a glint space point received from the glint detection module and a display space point that corresponds to a location of a UI element displayed on the display. Generating at least one calibration point may include generating a calibration point for each UI element displayed on the display, each calibration point associated with a UI element including a glint space point received from the glint detection module and a display space point that corresponds to the location of the UI element on the display. Updating an eye tracking calibration may include adding a calibration point to at least one parent calibration point model that includes a plurality of calibration points to generate at least one child calibration point model.

The method may further include fitting, by the at least one processor, a transform to the calibration points of the at least one child calibration point model.

A wearable heads-up display device (WHUD) may be summarized as including: a support frame; a display carried by the support frame; a glint detection module carried by the support frame; at least one processor carried by the support frame, the at least one processor communicatively coupled to the display and the glint detection module; and at least one nontransitory processor-readable storage medium carried by the support frame, the at least one nontransitory processor-readable storage medium communicatively coupled to the at least one processor, wherein the at least one nontransitory processor-readable storage medium stores data or processor-executable instructions that, when executed by the at least one processor, cause the at least one processor to: cause the display to display at least one user interface (UI) element; and detect a gaze location of a user based at least in part on glint information received from the glint detection module and a known location of at least one of the at least one UI element on the display.

The data or processor-executable instructions, when executed by the at least one processor, may cause the at least one processor to cause the display to display a number of UI elements that is below a threshold determined to enable accurate gaze location detection.

The data or processor-executable instructions, when executed by the at least one processor, may cause the at least one processor to cause the display to maximize the respective distances between a plurality of UI elements displayed on the display.

The data or processor-executable instructions, when executed by the at least one processor, may cause the at least one processor to cause the display to minimize a similarity between an angle and a length of vectors that join pairs of a plurality of UI elements displayed on the display.

The data or processor-executable instructions, when executed by the at least one processor, may cause the at least one processor to cause the display to display at least one animated UI element.

The data or processor-executable instructions, when executed by the at least one processor, may cause the at least one processor to update an eye tracking calibration based at least in part on the detected gaze location. The at least one processor may generate at least one calibration point based at least in part on the detected gaze location, the at least one calibration point comprising a glint space point received from the glint detection module and a display space point that corresponds to a location of a UI element displayed on the display. The at least one processor may generate a calibration point for each UI element displayed on the display, each calibration point associated with a UI element comprising a glint space point received from the glint detection module and a display space point that corresponds to the location of the UI element on the display. The at least one processor may add a calibration point to at least one parent calibration point model that comprises a plurality of calibration points to generate at least one child calibration point model. The at least one processor may fit a transform to the calibration points of the at least one child calibration point model.

A method of operating a wearable heads-up display device (WHUD) comprising a display and a glint detection module may be summarized as including obtaining, by at least one processor, one or more calibration point models each comprising a plurality of calibration points, each calibration point comprising: a glint space point in a glint space captured by the glint detection module, the glint space point representative of a position of an eye of a user of the WHUD; and a display space point in a display space of the display, the display space point representative of a location on the display at which a gaze of the user is inferred to be resting when the glint space point is captured by the glint detection module; generating, by the at least one processor, a transform from the glint space to the display space for each of the one or more calibration point models; determining, by the at least one processor, user gaze location in the display space using received glint information and the generated transform; from time-to-time during regular operation of the WHUD by the user, generating, by the at least one processor, at least one additional calibration point; adding, by the at least one processor, the additional calibration point to at least one of the calibration point models to generate one or more child calibration point models; generating, by the at least one processor, a transform for each of the one or more child calibration point models; and determining, by the at least one processor, a user gaze location in the display space using at least one glint space point received from the glint detection module and at least one transform of the one or more child calibration point models.

Generating at least one additional calibration point may include generating an additional inferred calibration point including a glint space point received from the glint detection module; and a display space point that corresponds to a location in the display space of a UI element determined to be the user gaze location.

Generating at least one additional calibration point may include generating an additional inferred calibration point for each of a plurality of UI elements displayed on the display, each inferred calibration point including a glint space point received from the glint detection module; and a display space point that corresponds to a location in the display space of one of the plurality of UI elements.

Generating at least one additional calibration point may include generating at least one additional selected calibration point including a glint space point received from the glint detection module; and a display space point that is a location of a UI element on the display selected by the user during regular operation of the WHUD. Determining a user gaze location in the display space using at least one glint space point received from the glint detection module and at least one transform may include determining a user gaze location in the display space using at least one glint space point received from the glint detection module and the one or more child calibration point models that include the at least one additional selected calibration point. Generating a transform may include generating an affine transform from the glint space to the display space. Generating a transform may include solving a matrix utilizing at least one of a QR decomposition method or singular value decomposition method.

The method may further include from time-to-time during regular operation of the WHUD by the user, evicting at least one calibration point from a calibration point model. Evicting at least one calibration point from a calibration point model may include evicting an oldest calibration point from the calibration point model. Evicting at least one calibration point from a calibration point model may include evicting a calibration point based on at least one of the locations of calibration points in the calibration point model or the times at which the calibration points in the calibration point model were obtained.

Obtaining a calibration point model including a plurality of calibration points may include populating, by the at least one processor, the display of the WHUD with a plurality of UI elements; for each of the plurality of UI elements, receiving, by the at least one processor, a selection of the UI element by the user; receiving, by the at least one processor, a glint space point from the glint detection module obtained concurrently with the selection of the UI element by the user; and generating, by the at least one processor, a calibration point that comprises the received glint space point and a display space point representative of the location of the UI element on the display of the WHUD. Populating the display of the WHUD with a plurality of UI elements may include populating the display with the plurality of UI elements one at a time in a sequential order.

Obtaining a calibration point model including a plurality of calibration points may include causing, by the at least one processor, four UI elements to be sequentially displayed on the display, each of the four UI elements sequentially displayed in a different one of four corners of the display; and obtaining, by the at least one processor, four calibration points that each correspond to a respective one of the UI elements, each calibration point comprising a display point the display space and a glint space point in the glint space.

Obtaining a calibration point model including a plurality of calibration points may include causing, by at least one processor, a UI element to move on the display of the WHUD according to a determined pattern; and generating, by the at least one processor, a plurality of calibration points as the UI element moves on the display, each calibration point includes a glint space point in the glint space captured by the glint detection module; and a display space point in the display space, the display space point representative of a location on the display of the moving UI element when the corresponding glint space point is captured by the glint detection module. Causing a UI element to move on the display of the WHUD according to a determined pattern may include causing a UI element to move on the display of the WHUD according to a rectangular-shaped pattern in a first direction and a second direction, the second direction opposite the first direction.

The method may further include receiving, by the at least one processor, at least one auxiliary sensor value from at least one auxiliary sensor during regular operation of the WHUD by the user; and optimizing, by the at least one processor, a transform of at least one calibration point model based at least in part on the received at least one auxiliary sensor value. Receiving at least one auxiliary sensor value may include obtaining at least one auxiliary sensor value from at least one of a proximity sensor, a gyroscope sensor or an accelerometer.

The method may further include receiving, by the at least one processor, a plurality of calibration points, each calibration point including a glint space point; a display space point; and at least one auxiliary sensor value from at least one auxiliary sensor obtained concurrently with the glint space point and the display space point; and training a machine learning model utilizing the plurality of calibration points, or data derived therefrom, the trained machine learning model receives as inputs at least one current auxiliary sensor value and outputs at least one of a set of calibration points or transform parameters.

The method may further include optimizing, by the at least one processor, at least one transform utilizing the trained machine learning model. Receiving a plurality of calibration points may include receiving a plurality of calibration points from the WHUD and from a population of WHUDs operated by a population of users.

A wearable heads-up display (WHUD) may be summarized as including a support frame; a display carried by the support frame; a glint detection module carried by the support frame that, in operation, determines glint space points in a glint space that correspond to a region in a field of view of an eye of a user at which a gaze of the eye is directed; at least one processor carried by the support frame, the at least one processor communicatively coupled to the display and the glint detection module; and at least one nontransitory processor-readable storage medium carried by the support frame, the at least one nontransitory processor-readable storage medium communicatively coupled to the at least one processor, wherein the at least one nontransitory processor-readable storage medium stores data or processor-executable instructions that, when executed by the at least one processor, cause the at least one processor to: obtain one or more calibration point models each comprising a plurality of calibration points, each calibration point comprising: a glint space point in a glint space captured by the glint detection module, the glint space point representative of a position of an eye of a user of the WHUD; and a display space point in a display space of the display, the display space point representative of a location on the display at which a gaze of the user is inferred to be resting when the glint space point is captured by the glint detection module; generate a transform from the glint space to the display space for each of the calibration point models; determine user gaze location in the display space using received glint information and the generated transform; from time-to-time during regular operation of the WHUD by the user, generate at least one additional calibration point; add the additional calibration point to at least one of the calibration point models to generate one or more child calibration point models; generate a transform for each of the one or more child calibration point models; and determine a user gaze location in the display space using at least one glint space point received from the glint detection module and at least one transform of the one or more child calibration point models.

The at least one processor may generate an additional inferred calibration point including a glint space point received from the glint detection module; and a display space point that corresponds to a location in the display space of a UI element determined to be the user gaze location. The at least one processor may generate an additional inferred calibration point for each of a plurality of UI elements displayed on the display, each inferred calibration point including a glint space point received from the glint detection module; and a display space point that corresponds to a location in the display space of one of a plurality of UI elements. The at least one processor may generate an additional selected calibration point including a glint space point received from the glint detection module; and a display space point that is a location of a UI element on the display selected by the user during regular operation of the WHUD. The at least one processor may determine a user gaze location in the display space using at least one glint space point received from the glint detection module and the one or more child calibration point models that include the additional selected calibration point. The at least one processor may generate an affine transform from the glint space to the display space. The at least one processor may solve a matrix utilizing at least one of a QR decomposition method or singular value decomposition method. The at least one processor may, from time-to-time during regular operation of the WHUD by the user, evict at least one calibration point from a calibration point model. The at least one processor may evict an oldest calibration point from the calibration point model. The at least one processor may evict a calibration point based on at least one of the locations of calibration points in the calibration point model or the times at which the calibration points in the calibration point model were obtained.

To obtain a calibration point model including a plurality of calibration points, the at least one processor may populate the display of the WHUD with a plurality of UI elements; and for each of the plurality of UI elements, receive a selection of the UI element by the user; receive a glint space point from the glint detection module obtained concurrently with the selection of the UI element by the user; and generate a calibration point that comprises the received glint space point and a display space point representative of the location of the UI element on the display of the WHUD. The at least one processor may populate the display of the WHUD with a plurality of UI elements one at a time in a sequential order. To obtain a calibration point model including a plurality of calibration points, the at least one processor may cause four UI elements to be sequentially displayed on the display, each of the four UI elements sequentially displayed in a different one of four corners of the display; and obtain four calibration points that each correspond to a respective one of the UI elements, each calibration point comprising a display point the display space and a glint space point in the glint space.

To obtain a calibration point model including a plurality of calibration points, the at least one processor may cause a UI element to move on the display of the WHUD according to a determined pattern; and generate a plurality of calibration points as the UI element moves on the display, each calibration point includes a glint space point in the glint space captured by the glint detection module; and a display space point in the display space, the display space point representative of a location on the display of the moving UI element when the corresponding glint space point is captured by the glint detection module. The determined pattern may include a rectangular-shaped pattern, and the at least one processor may cause the UI element to move in the rectangular-shaped pattern in a first direction; and cause the UI element to move in the rectangular-shaped pattern in a second direction, the second direction opposite the first direction. The at least one processor may receive at least one auxiliary sensor value from at least one auxiliary sensor during regular operation of the WHUD by the user; and optimize a transform of at least one calibration point model based at least in part on the received at least one auxiliary sensor value. The at least one auxiliary sensor may include at least one of a proximity sensor, a gyroscope sensor or an accelerometer.

The at least one processor may receive a plurality of calibration points, each calibration point including a glint space point; a display space point; and at least one auxiliary sensor value from at least one auxiliary sensor obtained concurrently with the glint space point and the display space point; and train a machine learning model utilizing the plurality of calibration points, or data derived therefrom, the trained machine learning model receives as inputs at least one current auxiliary sensor value and outputs at least one of a set of calibration points or transform parameters. The at least one processor may optimize at least one transform utilizing the trained machine learning model. The at least one processor may receive a plurality of calibration points from the WHUD and from a population of WHUDs operated by a population of users.

A method of operating a wearable heads-up display device (WHUD) comprising a display and a glint detection module may be summarized as including receiving, by at least one processor, a glint space point in a glint space captured by the glint detection module, the glint space point representative of a position of an eye of a user of the WHUD; from time-to-time during regular operation of the WHUD by the user, determining, by the at least one processor, a gaze location in a display space of the display based on the received glint space point and one or more calibration point models, each of the one or more calibration point models comprising a plurality of calibration points, each calibration point including a glint space point; and a display space point in the display space of the display, the display space point representative of a location on the display of a user interface (UI) element displayed on the display; and dynamically generating one or more child calibration point models by, for each calibration point model: generating, by the at least one processor, one or more additional calibration points; and adding, by the at least one processor, the one or more additional calibration points to the calibration point model. Generating the one or more additional calibration points may include generating an additional inferred calibration point. Generating the one or more additional calibration points may include generating a selected calibration point.

The method may further include evicting a calibration point from the one or more calibration point models. Evicting a calibration point from the one or more calibration point models may include evicting an oldest calibration point from the one or more calibration point models. Evicting a calibration point from the one or more calibration point models may include evicting a calibration point based on at least one of the locations of calibration points in the one or more calibration point models or the times at which the calibration points in the one or more calibration point models were obtained.

The method may further include generating, by the at least one processor, a transform from the glint space to the display space for each of the one or more calibration point models. Generating a transform may include generating an affine transform from the glint space to the display space. Generating a transform may include solving a matrix utilizing at least one of a QR decomposition method or singular value decomposition method. The method may further include receiving, by the at least one processor, at least one auxiliary sensor value from at least one auxiliary sensor during regular operation of the WHUD by the user; and optimizing, by the at least one processor, the transform from the glint space to the display space for each of the one or more calibration point models based at least in part on the received at least one auxiliary sensor value. Receiving at least one auxiliary sensor value may include obtaining at least one auxiliary sensor value from at least one of a proximity sensor, a gyroscope sensor or an accelerometer.

Each calibration point may further include at least one auxiliary sensor value from at least one auxiliary sensor obtained concurrently with the glint space point and the display space point, and the method may further include, for each of the one or more calibration point models, training a machine learning model utilizing the plurality of calibration points, or data derived therefrom, wherein the trained machine learning model receives as inputs at least one current auxiliary sensor value and outputs a set of calibration points.

A wearable heads-up display (WHUD) may be summarized as including a support frame; a display carried by the support frame; a glint detection module carried by the support frame that, in operation, determines glint space points in a glint space that correspond to a region in a field of view of an eye of a user at which a gaze of the eye is directed; at least one processor carried by the support frame, the at least one processor communicatively coupled to the display and the glint detection module; and at least one nontransitory processor-readable storage medium carried by the support frame, the at least one nontransitory processor-readable storage medium communicatively coupled to the at least one processor, wherein the at least one nontransitory processor-readable storage medium stores data or processor-executable instructions that, when executed by the at least one processor, cause the at least one processor to: receive a glint space point in a glint space captured by the glint detection module, the glint space point representative of a position of an eye of a user of the WHUD; from time-to-time during regular operation of the WHUD by the user, determine a gaze location in a display space of the display based on the received glint space point and one or more calibration point models, each of the one or more calibration point models comprising a plurality of calibration points, each calibration point comprising: a glint space point; and a display space point in the display space of the display, the display space point representative of a location on the display of a user interface (UI) element displayed on the display; and dynamically generating one or more child calibration point models, wherein to dynamically generate one or more child calibration point models, the at least one processor, for each calibration point model: generates one or more additional calibration points; and adds the one or more additional calibration points to the calibration point model. The additional calibration point may include an additional inferred calibration point. The additional calibration point may include a selected calibration point. The at least one processor may evict a calibration point from the one or more calibration point models. For example, the at least one processor may evict an oldest calibration point from the one or more calibration point models, and/or the at least one processor may evict a calibration point based on at least one of the locations of calibration points in the one or more calibration point models or the times at which the calibration points in the one or more calibration point models were obtained.

The at least one processor may generate a transform from the glint space to the display space for each of the one or more calibration point models. The at least one processor may generate an affine transform from the glint space to the display space. The at least one processor may solve a matrix utilizing at least one of a QR decomposition method or singular value decomposition method. The at least one processor may receive at least one auxiliary sensor value from at least one auxiliary sensor during regular operation of the WHUD by the user, and optimize the transform from the glint space to the display space for each of the one or more calibration point models based at least in part on the received at least one auxiliary sensor value.

The WHUD may further include at least one auxiliary sensor selected from a group consisting of: a proximity sensor, a gyroscope sensor, and an accelerometer. For each of the one or more calibration point models, the at least one processor may train a machine learning model utilizing the plurality of calibration points, or data derived therefrom, wherein the trained machine learning model receives as inputs at least one current auxiliary sensor value and outputs a set of calibration points.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 7 depicts a display of a wearable heads-up display, and shows a number of calibration points obtained while a UI element moves in a rectangular pattern around the perimeter of the display, in accordance with the present systems, devices, and methods.

FIG. 8 depicts a display of a wearable heads-up display, and shows a number of calibration points obtained while a UI element moves in a rectangular pattern around the perimeter of the display, with the calibration points shifted around the perimeter of the display with respect to the calibration points shown in FIG. 7, in accordance with the present systems, devices, and methods.

DETAILED DESCRIPTION

Figure 1:
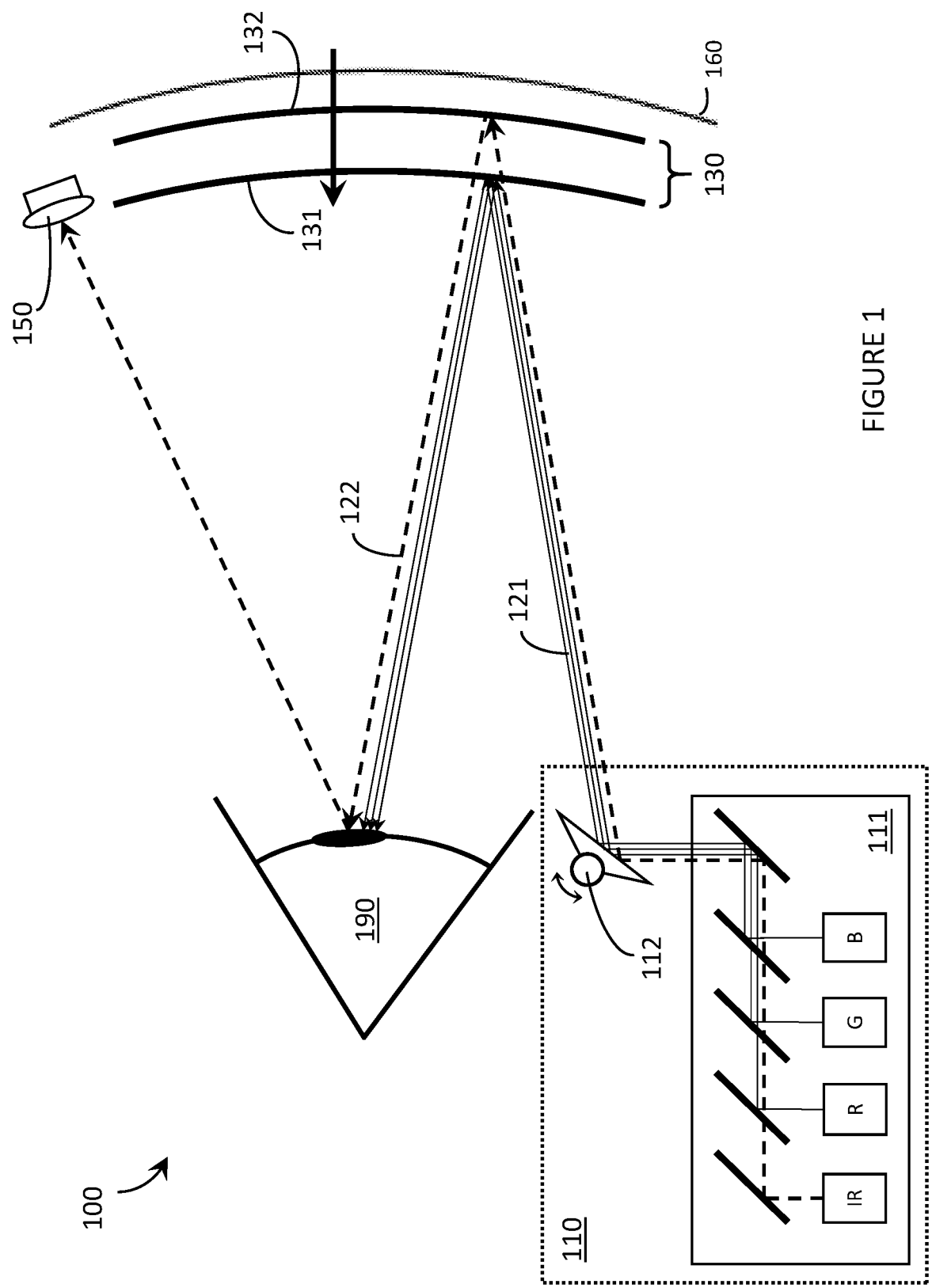
FIG. 1 is an illustrative diagram showing a side view of a wearable heads-up display, in accordance with the present systems, devices, and methods.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

The various implementations described herein provide systems, devices, and methods for laser eye tracking in wearable heads-up displays. More specifically, the various implementations described herein provide methods of determining the gaze direction of an eye of a user and are particularly well-suited for use in wearable heads-up displays ("WHUDs") that employ scanning laser projectors ("SLPs"). Examples of WHUD systems, devices, and methods that are particularly well-suited for use in conjunction with the present systems, devices, and methods for laser eye tracking are described in, for example, U.S. Non-Provisional patent application Ser. No. 15/167,458, U.S. Non-Provisional patent application Ser. No. 15/167,472, U.S. Non-Provisional patent application Ser. No. 15/167,484, and U.S. Non-Provisional patent application Ser. No. 15/331,204.

Initially, an example method of determining a gaze direction of an eye of a user of a WHUD is provided. Next, various example WHUDs are discussed with regard to FIGS. 1 and 2. Then, various static and dynamic calibration systems, methods and articles of the present disclosure are discussed with reference to FIGS. 3-9.

Method of Eye Tracking

For the purpose of the following discussion, the term "user" refers to a person that is operating and/or wearing the hardware elements described below (e.g., a person that is wearing a wearable heads-up display, as described in more detail below).

Figure 2:
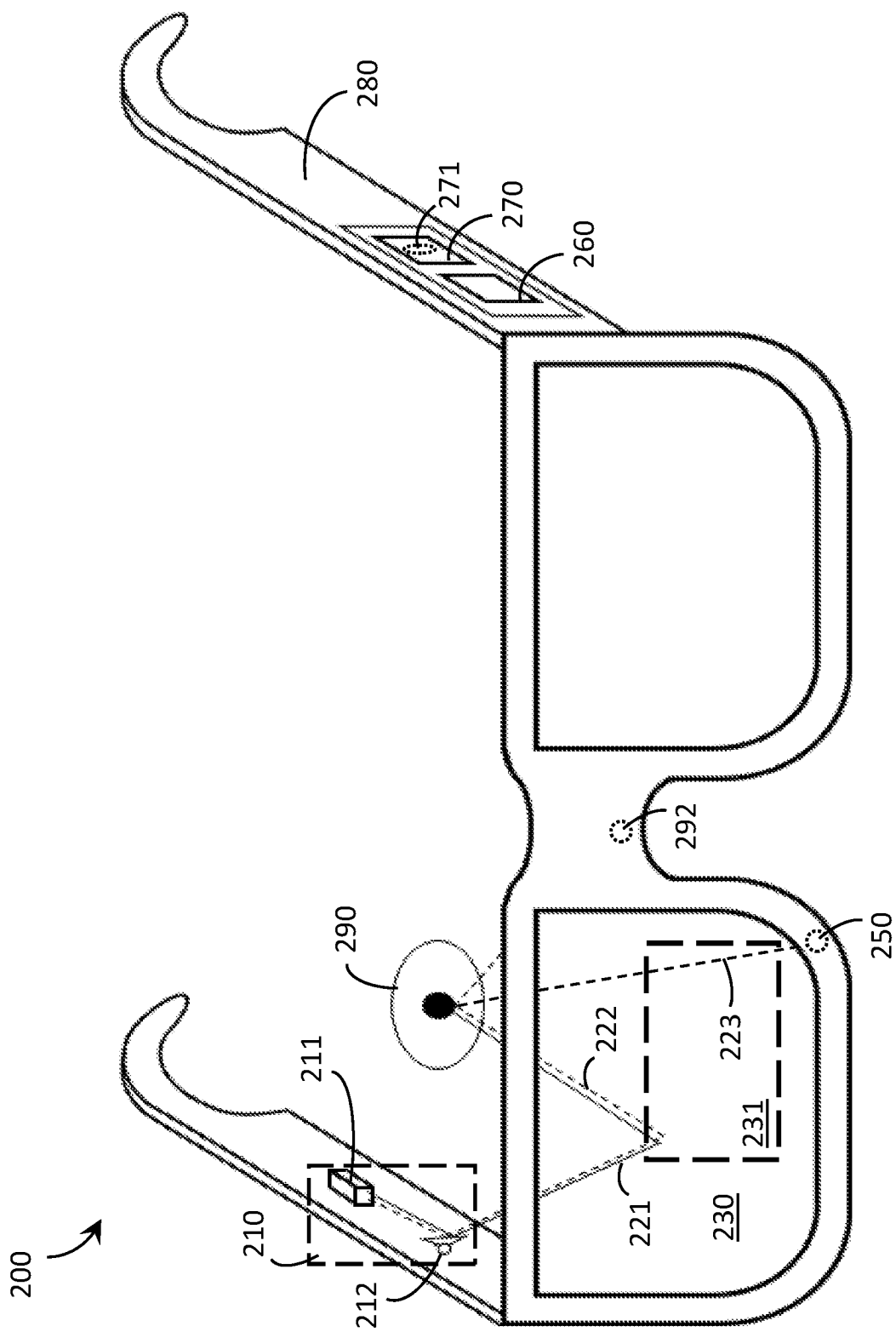
FIG. 2 is a perspective view of a wearable heads-up display, in accordance with the present systems, devices, and methods.

In at least some implementations, an eye tracking system of a WHUD may include a "glint detection module" that includes at least one infrared laser diode, at least one scan mirror, at least one infrared sensor, at least one processor, and at least one nontransitory processor-readable storage medium that stores at least one of instructions or data that, when executed by the at least one processor, cause the WHUD to implement the functionality discussed below. Examples of glint detection modules are shown in FIGS. 1 and 2.

In at least some implementations, the infrared laser diode may generate infrared laser light. Depending on the specific implementation, the infrared laser diode may activate and remain active in order to continuously generate a continuous beam of infrared laser light, or the infrared laser diode may be modulated to generate a sequence or pattern of infrared laser light. Throughout this specification and the appended claims, the term "infrared" includes "near infrared" and generally refers to a wavelength of light that is larger than the largest wavelength of light that is typically visible to the average human eye. Light that is visible to the average human eye (i.e., "visible light" herein) is generally in the range of 400 nm-700 nm, so as used herein the term "infrared" refers to a wavelength that is greater than 700 nm, up to 1 mm. As used herein and in the claims, visible means that the light includes wavelengths within the human visible portion of the electromagnetic spectrum, typically from approximately 400 nm (violet) to approximately 700 nm (red).

The at least one scan mirror may scan the infrared laser light over the eye of the user. Depending on the modulation of the infrared laser diode, the at least one scan mirror may scan the infrared laser light over (e.g., completely illuminate) a substantially continuous surface of the eye or the at least one scan mirror may scan the infrared laser light to form an illumination pattern on the surface of the eye (such as a grid pattern, a crosshairs pattern, and so on). Generally, in order for the at least one scan mirror to scan the infrared laser light over the eye of the user, the at least one scan mirror may sweep through a range of orientations and, for a plurality of orientations of the at least one scan mirror (i.e., for each respective orientation of the at least one scan mirror if the infrared laser diode is continuously active in order to completely illuminate the corresponding surface of the eye, or for a subset of orientations of the at least one scan mirror if the infrared laser diode is modulated such that the combination of subsets of orientations of the at least one scan mirror and the modulation pattern of the infrared laser diode produces an illumination pattern on the corresponding surface of the eye), the at least one scan mirror may receive the infrared laser light from the infrared laser diode and reflect the infrared laser light towards a respective region of the eye of the user.

The at least one scan mirror may include one or multiple (e.g., in a DLP configuration) digital microelectromechanical systems ("MEMS") mirror(s) or one or multiple piezoelectric mirrors.

In some implementations, the at least one scan mirror may scan infrared laser light directly over at least a portion of the eye of the user. In other implementations (e.g., in applications in which eye tracking is performed by a scanning laser-based WHUD), the at least one scan mirror may indirectly scan infrared laser light over at least a portion of the eye of the user by scanning the infrared laser light over an area of a light-redirection element (such as a holographic optical element ("HOE"), a diffraction grating, a mirror, a partial mirror, or a waveguide structure) positioned in the field of view of the eye of the user and the light-redirection element may redirect the infrared laser light towards the eye of the user. In implementations that employ such indirect scanning, the light-redirection element (e.g., the HOE) may, upon redirection of the infrared laser light towards the eye of the user, converge the infrared laser light to an exit pupil at the eye of the user, where the exit pupil encompasses at least the cornea of the eye of the user (when the user is looking in a specific direction, such as straight ahead or straight towards display content displayed by a WHUD).

Reflections of the infrared laser light from the eye of the user are detected by the at least one infrared sensor, such as an infrared detector or, more specifically, an infrared photodetector. As will be discussed in more detail below, the at least one infrared sensor may be communicatively coupled to a processor (e.g., a digital processor, or an application-specific integrated circuit) and provide an output signal having a magnitude that depends on an intensity of the infrared laser light detected by the infrared sensor.

The at least one processor communicatively coupled to the at least one infrared sensor may determine a respective intensity of a plurality of the reflections of the infrared laser light detected by the infrared sensor (i.e., "detected reflections"). The percentage of detected reflections for which the processor determines an intensity may depend on, for example, the sampling rate of the processor. The "intensity"

of a detected reflection may be a measure of, for example, the brightness of the detected reflection, the luminance of the detected reflection, and/or the power of the detected reflection.

The processor may identify at least one detected reflection for which the intensity exceeds a threshold value. Generally, the at least one infrared sensor may be oriented to detect both spectral and diffuse reflections of the infrared laser light from the eye of the user; however, in some implementations the processor may specifically identify a detected reflection for which the intensity exceeds a threshold value only when the infrared sensor detects a spectral reflection of the infrared laser light from the eye of the user. Such spectral reflection may, for example, correspond to the cornea reflection, first Purkinje image, or "glint."

As previously described, the processor may sample the signal output by the at least one infrared sensor, where the magnitude of the signal (and therefore the magnitude of each sample) depends on the intensity of the infrared laser light detected by the at least one infrared sensor. In this case, the processor may identify at least one detected reflection for which the intensity exceeds a threshold value by identifying a first sample (in a series of samples) for which the magnitude exceeds a threshold magnitude. In other words, identifying, by the processor, at least one detected reflection for which the intensity exceeds a threshold value may be an edge-triggered (e.g., rising edge-triggered) process. If desired, the processor may then continue to identify that subsequent detected reflections each have intensities that do exceed the threshold until the processor identifies a second sample in the series for which the magnitude does not exceed the threshold magnitude (e.g., a falling edge-triggered process).

The processor may determine the orientation of the at least one scan mirror that corresponds to the at least one detected reflection for which the intensity exceeds the threshold value. In other words, the processor determines which orientation of the at least one scan mirror caused the infrared laser light to reflect from the eye of the user, as detected, with an intensity that exceeds the determined threshold value.

The processor may determine a region in a field of view of the eye of the user at which a gaze of the eye is directed based on the orientation of the at least one scan mirror that corresponds to the at least one detected reflection for which the intensity exceeds the determined threshold value. Generally, this may include effecting, by the processor, a mapping between the orientation of the at least one scan mirror that corresponds to the at least one detected reflection for which the intensity exceeds the threshold value and the field of view of the eye of the user.

As an example, the processor may essentially effect a mapping between "detected reflection space" and "mirror orientation space" which, since only detected reflections that exceed the threshold value are of interest and since detected reflections that exceed the threshold value may generally be "glints," may be interpreted as a mapping between "glint space" and "mirror orientation space." Then, the processor may essentially effect a mapping between "mirror orientation space" and gaze direction of the eye based on established correlations between various mirror orientations and where the corresponding infrared laser light would appear in the user's field of view (e.g., if redirected by a light-redirection element such as an HOE positioned in the user's field of view) if the infrared laser light was visible to the user. In this way, the method may essentially effect a mapping between "glint space" and "gaze direction space."

Fundamentally, the processor may effect a mapping between the orientation of the at least one scan mirror that corresponds to the at least one detected reflection for which the intensity exceeds the threshold value (e.g., "glint space") and the field of view of the eye of the user (e.g., "field of view space") or a location on a display of the WHUD (e.g., "display space") by performing at least one transformation between a set of scan mirror orientations and a set of gaze directions of the eye of the user. Non-limiting examples of the at least one transformation include a linear transformation, a geometric transformation, an affine transformation, a neural network-based transformation, etc. In various implementations, such may include any number of intervening transformations, such as a transformation from glint space to a set of display coordinates and a transformation from the set of display coordinates to the set of gaze directions of the eye of the user.

Depending on the specific implementation, the at least one scan mirror may include a single scan mirror that is controllably orientable about two orthogonal axes or two scan mirrors that are each respectively controllable about a respective axis, with the respective axes about which the two scan mirrors are controllably orientable being orthogonal to one another. For example, a single scan mirror may scan the infrared laser light over two dimensions of the user's eye, or a first scan mirror may scan the infrared laser light across a first dimension of the eye and a second scan mirror may scan the infrared laser light across a second dimension of the eye. The at least one scan mirror may sweep through a range of orientations. In the case of two orthogonal scan mirrors, this may mean that a first scan mirror sweeps through a first range of orientations and, for each respective orientation of the first scan mirror, a second scan mirror sweeps through a second range of orientations. It follows that, for a plurality of orientations of the at least one scan mirror, the at least one scan mirror receives the infrared laser light from the infrared laser diode and reflects the infrared laser light towards a respective region of the eye of the user, with two orthogonal scan mirrors the infrared laser light is reflected towards a respective region of the eye of the user for each respective combination of a first orientation of the first scan mirror and a second orientation of the second scan mirror. Furthermore, with two orthogonal scan mirrors the processor may determine the combination of the first orientation of the first scan mirror and the second orientation of the second scan mirror that corresponds to the at least one detected reflection for which the intensity exceeds the threshold value and the processor may determine the region in the field of view of the eye of the user at which the gaze of the eye is directed based on the combination of the first orientation of the first scan mirror and the second orientation of the second scan mirror that corresponds to the at least one detected reflection for which the intensity exceeds the threshold value.

As previously described, the method may be particularly advantageous when implemented in a WHUD that employs a SLP because in such an implementation the eye tracking (i.e., gaze direction detection) functionality of the method may be achieved with minimal hardware additions (and correspondingly minimal bulk and impact on aesthetic design) to the WHUD. In this case, the method may be extended to include a projection of display content to the user and a determination of where in the display content the user's gaze is directed.

For example, the infrared laser diode and the at least one scan mirror of the method may be components of a SLP, and the SLP may further include at least one additional laser diode to generate visible laser light. In this case, the method may be extended to include projecting visible display content in the field of view of the eye of the user by the SLP and the processor may determine a region of the visible display content at which the gaze of the eye is directed based on the orientation of the at least one scan mirror that corresponds to the at least one detected reflection for which the intensity exceeds the threshold value. The processor may determine a region of the visible display content at which the gaze of the eye is directed by performing a transformation between a set of scan mirror orientations and a set of regions of the visible display content. In other words, the processor may effect a mapping between "mirror orientation space" (or "glint space," as previously described) and "display space."

Example WHUDs

FIG. 1 is an illustrative diagram showing a WHUD 100 that includes a SLP 110 with an integrated eye tracking functionality in accordance with the present systems, devices, and methods. In brief, WHUD 100 includes the SLP 110 which is adapted to include an infrared laser diode (labeled as "IR" in FIG. 1) for eye tracking purposes and a transparent combiner comprising a wavelength-multiplexed HOE 130 integrated with (e.g., laminated or otherwise layered upon, or cast within) an eyeglass lens 160. Integration of HOE 130 with lens 160 may include and/or employ the systems, devices, and methods described in U.S. Non-Provisional patent application Ser. No. 15/256,148 and/or U.S. Provisional Patent Application Ser. No. 62/268,892.

In WHUD 100, scanning laser projection and eye tracking components are both integrated into a single package/module 110. Specifically, SLP 110 comprises a laser module 111 that includes red laser diode (labelled "R" in FIG. 1), a green laser diode (labelled "G" in FIG. 1), and a blue laser diode (labelled "B" in FIG. 1) and a scan mirror 112 (a single mirror illustrated for simplicity, though as previously described at least two orthogonally-orientable mirrors may be used). In addition, laser module 111 also includes an infrared laser diode (labelled "IR" in FIG. 1) for use in eye tracking/gaze detection. Scan mirror 112 simultaneously serves as both the scan mirror for laser projection and a scan mirror for eye tracking, whereby scan mirror 112 scans infrared laser light (represented by dashed lines 122 in FIG. 1) over the area of eye 190 to sequentially illuminate an area of eye 190 (e.g., via a raster scan of IR light). In WHUD 100, infrared laser diode is integrated into laser module 111 of SLP 110 and scan mirror 112 serves to scan both visible (R, G, and/or B) and infrared (IR) laser light over eye 190.

Scan mirror 112 may advantageously include one or multiple (e.g., in a DLP configuration) digital microelectromechanical systems ("MEMS") mirror(s). In typical operation, scan mirror 112 of SLP 110 repeatedly scans over its entire range of orientations and effectively scans over the entire field of view of the display. Whether or not an image/pixel is projected at each scan orientation depends on controlled modulation of laser module 111 and its synchronization with scan mirror 112. The fact that scan mirror 112 generally scans over its entire range during operation as a laser projector makes scan mirror 112 of SLP 110 compatible with use for eye tracking purposes. SLP 110 is adapted to provide eye tracking functionality without having to compromise or modify its operation as a SLP. In operation, scan mirror 112 repeatedly scans over its entire range of orientations while the RGB laser diodes are modulated to provide the visible light 121 corresponding to pixels of a scanned image or, generally, "display content." At the same time, the infrared laser diode may be activated to illuminate the user's eye 190 (one spot or pixel at a time, each corresponding to a respective scan mirror orientation) with infrared laser light 122 for eye tracking purposes. Depending on the implementation, the infrared laser diode may simply be on at all times to completely illuminate (i.e., scan over the entire area of) eye 190 with infrared laser light 122 or the infrared laser diode may be modulated to provide an illumination pattern (e.g., a grid, a set of parallel lines, a crosshair, or any other shape/pattern) on eye 190. Because infrared laser light 122 is invisible to eye 190 of the user, infrared laser light 122 does not interfere with the scanned image being projected by SLP 110.

In order to detect the (e.g., portions of) infrared laser light 122 that reflects from eye 190, WHUD 100 includes at least one infrared photodetector 150. While only one photodetector 150 is depicted in FIG. 1, in alternative implementations any number of photodetectors 150 may be used (e.g., an array of photodetectors 150, or a charge-coupled device based camera that is responsive to light in the infrared wavelength range) positioned in any arrangements and at any desired location(s) depending on the implementation.

As scan mirror 112 scans modulated R, G, and/or B light 121 over eye 190 to produce display content based on modulation of the R, G, and/or B laser diodes, scan mirror 112 also scans infrared laser light 122 over eye 190 based on modulation of the IR laser diode. Photodetector 150 detects an intensity pattern or map of reflected infrared laser light 122 that depends on the position/orientation of eye 190. That is, each distinct orientation of scan mirror 112 may result in a respective intensity of infrared laser light 122 being detected by photodetector 150 that depends on the position/orientation of eye 190 (or the position/orientation of feature(s) of eye 190, such as the cornea, iris, pupil, and so on). The intensity pattern/map detected by photodetector 150 depends on where eye 190 is looking. In this way, the same SLP 110 in WHUD 100 enables both i) image projection, and ii) the gaze direction and movements of eye 190 to be measured and tracked.

Another adaptation to WHUD 100, for the purpose of integrating eye tracking functionality into SLP 110, is wavelength-multiplexing of HOE 130. WHUD 100 includes a HOE 130 that redirects laser light output from the laser module 111 of SLP 110 towards eye 190; however, in WHUD 100, HOE 130 includes at least two wavelength-multiplexed holograms: at least a first hologram 131 that is responsive to (i.e., redirects at least a portion of, the magnitude of the portion depending on the playback efficiency of the first hologram) the visible light 121 output by laser module 111 and unresponsive to (i.e., transmits) the infrared light 122 output by laser module 111, and a second hologram 132 that is responsive to (i.e., redirects at least a portion of, the magnitude of the portion depending on the playback efficiency of the second hologram) the infrared light 122 output by laser module 111 and unresponsive to (i.e., transmits) the visible light 121 output by laser module 111. While FIG. 1 depicts first hologram 131 as a single hologram, in practice the aspect(s) of HOE 130 that is/are responsive to the visible light 121 output by laser module 111 may include any number of holograms that may be multiplexed in a variety of different ways, including without limitation: wavelength multiplexed (i.e., a "red" hologram that is responsive to only red light from the red laser diode of laser module 111, a "green" hologram that is responsive to only green light from the green laser diode of laser module 111, and a "blue" hologram that is responsive to only blue light from the blue laser diode of laser module 111), angle multiplexed (e.g., for the purpose of eye box expansion/replication), phase multiplexed, spatially multiplexed, temporally multiplexed, and so on. Upon redirection of visible light 121, first hologram 131 may apply a first optical power to visible light 121. Advantageously, the first optical power applied by first hologram 131 (or by the first set of multiplexed holograms if the implementation employs a set of multiplexed holograms for redirecting the visible light 121) may be a positive optical power that focuses or converges the visible light 121 to, for example, an exit pupil having a diameter less than one centimeter (e.g., 6 mm, 5 mm, 4 mm, 3 mm) at the eye 190 of the user for the purpose of providing a clear and focused image with a wide field of view. Upon redirection of infrared light 122, second hologram 132 may apply a second optical power to infrared light 122, where the second optical power applied by second hologram 132 is different from the first optical power applied by first hologram 131. Advantageously, the first optical power may be greater than the second optical power (and therefore, the second optical power may be less than the first optical power) so that second hologram 132 redirects infrared light 122 over an area of eye 190 that is larger than the exit pupil of visible light 121 at eye 190. In other words, the first hologram that is responsive to the visible light may converge the visible light to a first exit pupil at the eye of the user and the second hologram that is responsive to the infrared light may converge the infrared light to a second exit pupil at the eye of the user, where the first exit pupil is completely contained within the second exit pupil at the eye of the user. For example, the second optical power of second hologram 132 may apply a rate of convergence to infrared light 122 that is less than the rate of convergence applied to visible light 121 by the first optical power of first hologram 131, or the second optical power may be zero such that second hologram 132 redirects infrared light 122 towards eye 190 without applying any convergence thereto, or the second optical power may be negative (i.e., less than zero) so that the second optical power of second hologram 132 causes infrared light 122 to diverge (i.e., applies a rate of divergence thereto) to cover, for example, the entire area of eye 190 (and beyond, if desired) for the purpose of illuminating a large area of eye 190 and tracking all eye positions/motions within that illuminated area.

Depending on the specific implementation, HOE 130 may comprise a single volume of holographic material (e.g., photopolymer or a silver halide compound) that encodes, carries, has embedded therein or thereon, or generally includes both first hologram 131 and second hologram 132, or alternatively HOE 130 may comprise at least two distinct layers of holographic material (e.g., photopolymer and/or a silver halide compound) that are laminated or generally layered together, a first layer of holographic material that includes first hologram 131 and a second layer of holographic material that includes second hologram 132.

The use of infrared light is advantageous in eye tracking systems because infrared light is invisible to the (average) human eye and so does not disrupt or interfere with other optical content being displayed to the user. Integrating an infrared laser diode into a SLP, in accordance with the present systems, devices, and methods, enables visible laser projection and invisible eye tracking to be simultaneously performed by substantially the same hardware of a WHUD, thereby minimizing overall bulk and processing/power requirements of the system.

In accordance with the present systems, devices, and methods, an eye tracking system (or an "eye tracker") may include one or more digital processor(s) communicatively coupled to the one or more infrared photodetector(s) and to one or more non-transitory processor-readable storage medium(ia) or memory(ies). The memory(ies) may store processor-executable instructions and/or data that, when executed by the processor, enable the processor to determine the position and/or motion of an eye of the user, or the gaze direction of the eye of the user, based on information (e.g., intensity information, such as an intensity pattern/map) provided by the one or more photodetector(s).

FIG. 2 is a perspective view of a WHUD 200 that integrates eye tracking and scanning laser projection in accordance with the present systems, devices, and methods. WHUD 200 includes many of the elements depicted in FIG. 1, namely: an SLP 210 comprising laser module 211 with at least one visible laser diode (e.g., a red laser diode, a green laser diode, a blue laser diode, or any combination thereof) to output a visible laser light 221 (e.g., a red laser light, a green laser light, a blue laser light, or any combination thereof) and an infrared laser diode to output infrared laser light 222, at least one scan mirror 212 aligned to receive laser light output from the laser module 211 and controllably orientable to reflect (i.e., scan) the laser light, a wavelength-multiplexed HOE 230 aligned to redirect the laser light 221 and 222 towards an eye 290 of a user, and at least one infrared photodetector 250 responsive to infrared laser light 222. Depending on the implementation, the visible laser light 221 may correspond to any of, either alone or in any combination, a red laser light, a green laser light, and/or a blue laser light. WHUD 200 also includes a support frame 280 that has a general shape and appearance or a pair of eyeglasses. Support frame 280 carries SLP 210, photodetector 250, and wavelength-multiplexed HOE 230 so that HOE 230 is positioned within a field of view of the eye 290 of the user when support frame 280 is worn on a head of the user.

Support frame 280 of WHUD 200 also carries a digital processor 260 communicatively coupled to SLP 210 and photodetector 250, and a non-transitory processor-readable storage medium or memory 270 communicatively coupled to digital processor 270. Memory 270 stores data and/or processor-executable instructions 271 that, when executed by processor 260, cause WHUD 200 to perform the functionality discussed herein. More specifically, data and/or processor-executable instructions 271, when executed by processor 260, cause WHUD 200 to: generate an infrared laser light 222 by the infrared laser diode of SLP 210; scan the infrared laser light 222 over the eye 290 of the user by the at least one scan mirror 212, wherein scanning the infrared laser light 222 over the eye 290 of the user by the at least one scan mirror 212 includes sweeping the at least one scan mirror 212 through a range of orientations and, for a plurality of orientations of the at least one scan mirror 212, reflecting the infrared laser light 222 towards a respective region of the eye 290 of the user; detect reflections 223 of the infrared laser light 222 from the eye 290 of the user by the at least one infrared photodetector 250; determine a respective intensity of each detected reflection 223 of the infrared laser light 222 by the processor 260; identify, by the processor 260, at least one detected reflection 223 for which the intensity exceeds a threshold value; determine, by the processor 260, the orientation of the at least one scan mirror 212 that corresponds to the at least one detected reflection 223 for which the intensity exceeds the threshold value; and determine, by the processor 260, a region in a field of view of the eye 290 of the user at which a gaze of the eye 290 is directed based on the orientation of the at least one scan mirror 212 that corresponds to the at least one detected reflection 223 for which the intensity exceeds the threshold value. Together, all of these acts enable WHUD 200 to determine a gaze direction of eye 290.

Since, in addition to eye tracking/gaze direction detection capability, WHUD 200 also has a display capability, memory 270 further stores data and/or processor-executable instructions that, when executed by processor 260, cause WHUD 200 to project visible display content 231 in the field of view of the eye 290 of the user by SLP 210 (in conjunction with HOE 230). In this case, data and/or processor-executable instructions 271, when executed by processor 260, may cause WHUD 200 to determine, by the processor 260, a region in a field of view of the eye 290 of the user at which a gaze of the eye 290 is directed based on the orientation of the at least one scan mirror 212 that corresponds to the at least one detected reflection 223 for which the intensity exceeds the threshold value, by causing WHUD 200 to determine, by the processor 260, a region of the visible display content 231 at which the gaze of the eye 290 is directed based on the orientation of the at least one scan mirror 212 that corresponds to the at least one detected reflection 223 for which the intensity exceeds the threshold value.

As previously described, infrared photodetector 250 may advantageously be positioned on support frame 280 at a periphery of the field of view of the eye 290 of the user when the eye 290 is gazing straight ahead (e.g., on the rims of frame 280 that surround the eyeglass lens that carries HOE 230). In this case, the data and/or processor-executable instructions that, when executed by the processor 260, cause WHUD 200 to project visible display content 231 in the field of view of the eye 290 of the user by the SLP 210, may advantageously cause the SLP 210 to position the visible display content 231 away-from-center in the field of view of the eye 290 of the user and towards the position of the at least one infrared photodetector 250 at the periphery of the field of view of the eye 290 of the user, as depicted in the exemplary implementation of FIG. 2.

In at least some implementations, the WHUD 200 may include one more auxiliary sensors 292 carried by the support frame 280 at one or more locations thereof. Non-limiting examples of such auxiliary sensors include proximity sensors, gyroscopes or accelerometers. A proximity sensor may be used to indicate where the support frame 280 is positioned relative to a "home" position on a user's face (e.g., distance from the proximity sensor to a point on the user's face, such as the nose bridge), which provides information about where the support frame 280 is located relative to the eye(s) of the user. A gyroscope sensor may be used to determine the orientation of a user's head during use of the WHUD 200. An accelerometer may be used to indicate patterns of acceleration, including sudden movements, that are occurring as the user wears the WHUD. As discussed further below, in at least some implementations auxiliary sensors may be used to improve calibration methods for the WHUD 200.

Throughout this specification, Figures, as well as the appended claims, reference is often made to the eye of the user. For example, FIG. 1 depicts eye 190, and FIG. 2 depicts eye 290. In general, the systems, devices, and methods described herein are suitable for use in association with at least one eye of a user (e.g., 190, 290) but do not themselves include the eye of the user. In other words, eye 190 is not a part of WHUD 100 and eye 290 is not a part of WHUD 200.

The various implementations described herein generally reference and illustrate a single eye of a user (i.e., monocular applications), but a person of skill in the art will readily appreciate that the present systems, devices, and methods may be duplicated in a WHUD in order to provide scanned laser projection and/or scanned laser eye tracking for both eyes of the user (i.e., binocular applications).

The various implementations described herein measure, sense, detect, identify, or otherwise determine the intensity of detected infrared reflections and use this information to identify when the intensity of a detected infrared reflection exceeds a threshold value. The threshold value may be a certain percentage above a baseline detection value, such as 10% above, 50% above, 100% above, 500% above, 1000% above, or so on depending on the specific implementation. A detected infrared reflection that exceeds the threshold value is used herein because such generally corresponds to a spectral reflection for the eye of the user known as the first Purkinje image or glint. The glint provides a useful, reliable, and sufficient detection feature for the purpose of determining the relative gaze direction of the eye of the user; thus, in method only detected reflections that correspond to glints are used to determine the gaze direction of the eye of the user. However, the entire collection of detected reflection intensities of the infrared laser light from the eye of the user can be useful in other applications. For example, the method may be employed to produce a complete (depending on the resolution given, at least in part, by the step size between orientations of the at least one scan mirror) infrared image of the eye of the user. This infrared image may be used for more detailed (and more computational intensive) eye tracking and gaze detection purposes, or for other purposes such as user authentication via iris or retinal blood vessel recognition. That is, conventional techniques and algorithms for iris recognition and/or retinal blood vessel recognition (which typically use visible light and color photography or videography) may be adapted to employ scanned infrared laser light and infrared images of the eye of the user generated by performing acts of the method (together with further acts of data processing to produce an infrared image and image processing to achieve recognition).

The various implementations of eye tracking systems and devices described herein may, in some implementations, make use of additional or alternative "Purkinje images" (i.e., other than the "glint") and/or may employ the "corneal shadow" based methods of eye tracking described in U.S. Non-Provisional patent application Ser. No. 15/331,204.

The WHUDs described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the transparent display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

Calibration Systems, Devices, and Methods

The following discussion provides example implementations of various calibration systems, methods and articles for eye tracking systems of WHUDs, such as the WHUDs 100 and 200 discussed above with reference to FIGS. 1 and 2, respectively.

Generally, the present disclosure provides various calibration approaches that may be used for an eye tracking system of a WHUD. As discussed further below, one approach includes a comprehensive initial explicit phase (e.g., required after unboxing of a WHUD by a user) to gather information and train user-specific machine learning models to assist with eye tracking and calibration. Example implementations of an implicit calibration phase that utilizes a user action that initiates an interaction with the WHUD are also provided. Additionally, implementations of a dynamic, implicit calibration during an interaction, using known user interface (UI) geometry, are provided.

According to one or more implementations, a minimally-obtrusive explicit calibration phase may be provided that has several features. For example, the explicit calibration phase may be initiated when the WHUD detects that the tolerance of movement, discussed below, is being approached or has been abruptly exceeded. The calibration phase may make the user aware that the WHUD must be returned to a home position on the user's head, and may await confirmation that the WHUD has been returned to the home position. The WHUD may then perform implicit calibration (e.g., without requiring deliberate user input, without requiring user knowledge of the calibration) so the user may resume the interaction with the WHUD. According to at least some implementations, a dynamic calibration system may provide continuous user and population learning to optimize user-specific machine learning models that assist with eye tracking and calibration.

Recent simulations by Applicant have shown that when a support frame of a WHUD moves down the nose of a user by 0.1 millimeters (mm), 1° of error may be introduced into the inferred gaze position. Recent experiments have also shown that significant nasal skin movement occurs during head movement. Since the display of a WHUD may span only 10°, for example, a movement of 0.5 mm introduces error such that when the user is looking at one half of the display, the cursor location may be inferred to be in the other half of the display, or even significantly outside of the display. Without calibration after such a movement, a simple binary choice in the UI, where each choice occupies half of the display, may not be possible. Accordingly, eye-tracking in WHUDs is very sensitive to movement of the WHUD with respect to the eye. Movements of a fraction of a millimeter can cause significant changes to the inferred gaze position, necessitating calibration.

A "home position" may be defined as the optimal snug position of the support frame of a WHUD manufactured for a given user. In practice, when movement of the support frame from the home position occurs (e.g., abruptly or over time), there exists a threshold where eye tracking error and/or calibration error will become too large for the UI to be reliably usable. This factor may be defined as the tolerance of movement.

Tolerance of movement is maximized when the effects of movement are minimized. As tolerance of movement increases, user experience improves drastically, and the need for glasses adjustment and calibration is reduced. Common use-cases that inherently involve movement (e.g., talking, walking, running, riding in a vehicle) become possible, and UI granularity can be increased significantly. Thus, WHUDs should have the largest possible tolerance of movement. User experience improves drastically as tolerance of movement increases.

The following discussion provides various approaches to calibration of the relationship between the user's eye position and the user's gaze location on the display of the WHUD to minimize the effects of physical movement of the support frame with respect to the user. As the tolerance of movement for accurate eye tracking increases, the frequency of required support frame adjustments, which causes interruption, decreases. Additionally, as eye tracking accuracy within this tolerance of movement increases, the accuracy of each calibration increases. This improves cursor accuracy, which decreases the number of subsequent calibrations that are needed and improves the accuracy of each calibration. Therefore, accurate and robust eye tracking is important to minimizing the effects of physical movement of the support frame with respect to the user.

In at least some implementations, a WHUD of the present disclosure may implement an implicit calibration scheme at interaction start. When the tolerance of movement is approached or abruptly exceeded, and the current interaction has been interrupted to allow the user to return the support frame to the home position, calibration may be necessary before the interaction can resume. Calibration may also be beneficial at the beginning of each interaction, to provide the best possible starting point for subsequent dynamic implicit calibration, discussed further below.

It may be desirable to avoid explicit calibration during everyday use of the WHUD. However, explicit calibration is generally much more reliable than implicit calibration, as the target of the user's gaze can be known with high confidence since the user selects one or more UI elements at known locations, as opposed to the user's gaze being inferred with lower confidence. It may be beneficial if an implicit calibration scheme with the reliability and accuracy of an explicit calibration scheme could be performed at the beginning of each interaction. The following discussion provides systems and methods to achieve this while offering a good user experience.

In at least some implementations, user action to initiate an interaction may double as a calibration action, thus making explicit calibration implicit. An interaction with the WHUD may begin in a consistent way, akin to beginning an interaction with a smartphone. An interaction may also be prevented from beginning unintentionally, akin to a smartphone's swipe-to-unlock feature. Such features create a user experience at interaction start that is very familiar to smartphone users, while also disguising explicit calibration, rendering it implicit. The following is an example implementation of an interaction start action.

A user may click a user interface device (e.g., an interface on the WHUD, a companion ring) to wake the display of the WHUD. At least one processor of the WHUD may show an unlock screen on the display that includes a small, personalizable UI element (e.g., logo). This UI element may move at a medium speed (e.g., from left to right across the display, in a rectangular pattern, in a circular pattern). This motion may be as smooth and unobtrusive as possible. The WHUD may rapidly detect that the user's eyes are following the UI element, and gather enough information to perform a calibration. This can be accomplished in a fraction of the time that it takes for the UI element to move across the display.

If no attempt to follow the UI element is made, or if calibration was not successful, the display may be controlled to enter a sleep mode. Per user customization, or if the WHUD deems that past calibration behavior has not been adequately robust, a more complex variant of the unlock screen may be shown (e.g., L-pattern, triangle pattern). There are many creative and functional possibilities, including providing personalization and security options.

As the WHUD detects that the user is becoming more experienced with the interaction start action, the speed of the UI element may increase gradually (to an upper bound), to reduce the overall time needed to execute the action. In at least some implementations, on average, the interaction start action may take under 0.5 seconds. This approach has the benefit of using a familiar click and swipe unlock action that will grab users' attention right away. Additionally, using this approach, unintentional clicks can be seamlessly ignored. A further advantage of this approach is that it hides explicit calibration, rendering it implicit. Further, calibration against a moving UI element significantly improves confidence in the calibration, as opposed to a static, one-point calibration. By providing an object to follow, smooth pursuit eye movement is possible, which allows many additional data points to be gathered in a short amount of time.

In at least some implementations, performing a calibration at interaction start may not be necessary. In such implementations, the interaction start action can be streamlined.

In at least some implementations, approach or breach of the tolerance of movement may require a reset action to resume interaction. When the tolerance of movement is being approached or has been abruptly exceeded, a "calibration reset" is preferable, to avoid the user losing confidence in the robustness of the UI. The following discussion provides an example implementation of a reset action.

When the WHUD detects that the tolerance of movement is being approached or has been abruptly exceeded, the display may be put into a sleep mode, for example. As another non-limiting example, a subtle indication in the UI to return the glasses to the "home position" may be presented. The user will expect and understand this behavior, which cues the user to return the WHUD to the home position, and then the WHUD may execute the interaction start action discussed above. Then, the current interaction is resumed.

This approach to the reset action offers a number of benefits. First, the reset action provides a seamless intervention before behavior of the UI becomes erratic, incorrect, or unresponsive. Second, the reset action cues the user to make a simple (and potentially rewarding) adjustment of the support frame, and then initiates the interaction start action, which the user is already proficient at. The interaction start action already contains the implicit calibration that should be executed after the adjustment of the WHUD on the user's head.

The user may choose to return the support frame to the home position while the support frame is still within the tolerance of movement. This could be comfort-related, in anticipation that the tolerance of movement will soon be approached, or in response to subtle eye tracking performance degradation. In at least some implementations, the WHUD detects this user action, and dynamic calibration attempts to seamlessly recover from this (possibly significant) change in physical position. If recovery is not possible, the current interaction may be interrupted, and the interaction start action should be presented to resume the interaction.

In at least some implementations, a proximity sensor may be used to detect a significant change in proximity. As another example, an outward-facing sensor (e.g., in the same area as the proximity sensor) may detect the user's finger contact (e.g., pushing the glasses to the home position). Such sensor may be used alone or in conjunction with the one or more inward-facing proximity sensors to improve robustness. As another example, an inertial measurement unit (IMU) may be used alone or in conjunction with one or both of the above-mentioned sensors.

In at least some implementations, the eye tracking system of a WHUD may provide dynamic implicit calibration during regular user interaction based on eye movement history, selections (e.g., clicks) and known UI geometry. Such information may be real-time, user-specific and context-specific, as opposed to historical, population-specific, and context-general. At a high level, dynamic implicit calibration continuously infers the sequence of selectable UI elements that the user's gaze has just traversed, then uses this information to update the calibration, which is the estimated relationship between the user's eye position and the user's gaze location on the glasses display, in real-time.

More complex optimizations, discussed further below, may be used to help guide the dynamic implicit calibration process (e.g., predicting support frame movement and calibration changes over time, calibration confidence estimations).

In at least some implementations, the UI of a WHUD may include various design features that facilitate dynamic implicit calibration. Several examples of such features are provided below.

As one example, the number of selectable UI elements presented on a display may be minimized, which reduces the possible number of UI elements on which the user's gaze is focused. For example, the number of UI elements display may be restricted to be below a threshold determined to enable accurate gaze location detection. As another example, the distance between selectable UI elements may be maximized. As another example, the similarity between the angle and length of vectors that join pairs of selectable UI elements may be minimized. This feature would allow the dynamic calibration process to have higher confidence when determining the UI element that gaze was shifted from and the element that gaze was shifted to. As another example, the UI may be animated such that resting gaze or selecting a UI element causes additional UI elements to appear, creating a more predictable "flow of gaze" and providing further opportunities for dynamic implicit calibration.

The following discussion provides an example implementation of a dynamic implicit calibration system, according to one implementation of the present disclosure. Additional examples are discussed below with reference to the figures.

In operation, the WHUD may identify when the user is looking at the display via glint information received from a glint detection module, and may disable UI element selection and calibration when the user is not looking at the display. The WHUD may obtain a calibration from interaction start. The calibration may be used to infer gaze position in real-time. This calibration may be updated at any time. The WHUD may identify when a UI element should be highlighted using a distance threshold, for example. The WHUD may identify when the user is holding their gaze on a point (A) on the display using time and distance thresholds, for example. If the point (A) is within the distance threshold of a UI element (A'), the UI element (A') may be highlighted, and the WHUD may infer that the user's gaze is resting on the UI element (A').

In at least some implementations, the WHUD may also identify when the user has shifted gaze to another point (B) on the display using time and distance thresholds. The WHUD may compare the vector (A)→(B) to all vectors between pairs of UI elements (A', B'), find the most similar vector (e.g., in terms of location, angle and magnitude), and compute a confidence measure from the similarity measure. If the confidence measure is below a threshold, the WHUD may remove highlighting from UI element (A') and may not update the calibration. Otherwise, the WHUD may infer that the user's gaze is resting on UI element (B'), may highlight (B'), and may update the calibration. If the confidence of a series of implicit calibrations is sufficiently low, the WHUD may disable the highlighting of UI elements to cue the user to shift gaze between UI elements to recalibrate, or perform the reset action. If the user selects a highlighted UI element, the WHUD may infer that the user's gaze is resting on the UI element, and update the calibration. The WHUD may improve performance by using a history of vectors, as opposed to the most recent vector, and may use efficient search algorithms to minimize computation.

As discussed elsewhere herein, aside from detecting abrupt changes, additional sensors (e.g., IMU, gyroscope, proximity sensor, stereo camera) may improve the calibration process by being used during an explicit or implicit initial calibration, or an explicit or implicit dynamic calibration. During explicit initial calibration, input from additional sensors may be used to parameterize an algorithmic process or train a machine learning model that dynamically predicts coarse calibration changes that are needed. This information may then be used to assist the dynamic implicit calibration process, thereby improving performance.

In at least some implementations, an IMU may be used to detect abrupt movements that may necessitate the reset action. As another example, an IMU and a gyroscope sensor may be used to detect changes in user mode (e.g., different head orientations, talking, walking). As another example, a proximity sensor and a front-facing touch sensor may be used to detect the reset action discussed above. As another example, an IMU, gyroscope sensor and eye tracking may be used to detect the Vestibulo Ocular Reflex, which would indicate that the user is looking beyond the glasses display.

During use of a WHUD by a given user, there are many opportunities to gather information that can be used to optimize the performance of the user's WHUD. This information may also be used to augment a general population model of WHUD use, which may improve baseline eye tracking and calibration performance for new users. Many different approaches of varying complexity are possible.

For example, in at least some implementations, the results of each user's initial explicit calibration may be sent anonymously to a central system (e.g., server) after requesting permission from the user. These results may be used to augment a large library of labeled training cases that is periodically used to train one or more new general explicit calibration models.

As another example, a history of dynamic implicit calibration during UI use, and conditions that required the reset action may be stored in a nontransitory processor-readable storage medium of the WHUD. This information may be transmitted to a device (e.g., smartphone, laptop, wearable computer, cloud storage) periodically via a wired or wireless interface (e.g., USB®, Bluetooth®). In an explicit process similar to downloading and installing a software update, the user may trigger a process on the device that trains new prediction models and uploads them to the WHUD. These may be models that assist with eye tracking, calibration, detecting when the user is beginning to have trouble with the UI, etc. The user may revert the update if the user detects significant performance degradation. Such information from this process may be sent anonymously to a remote system for processing, after requesting permission from the user. This information may then be used to improve the user experience, improve the default machine learning models that are included with WHUDs, improve companion software's ability to predict how helpful an update will be, etc.

Figure 3:
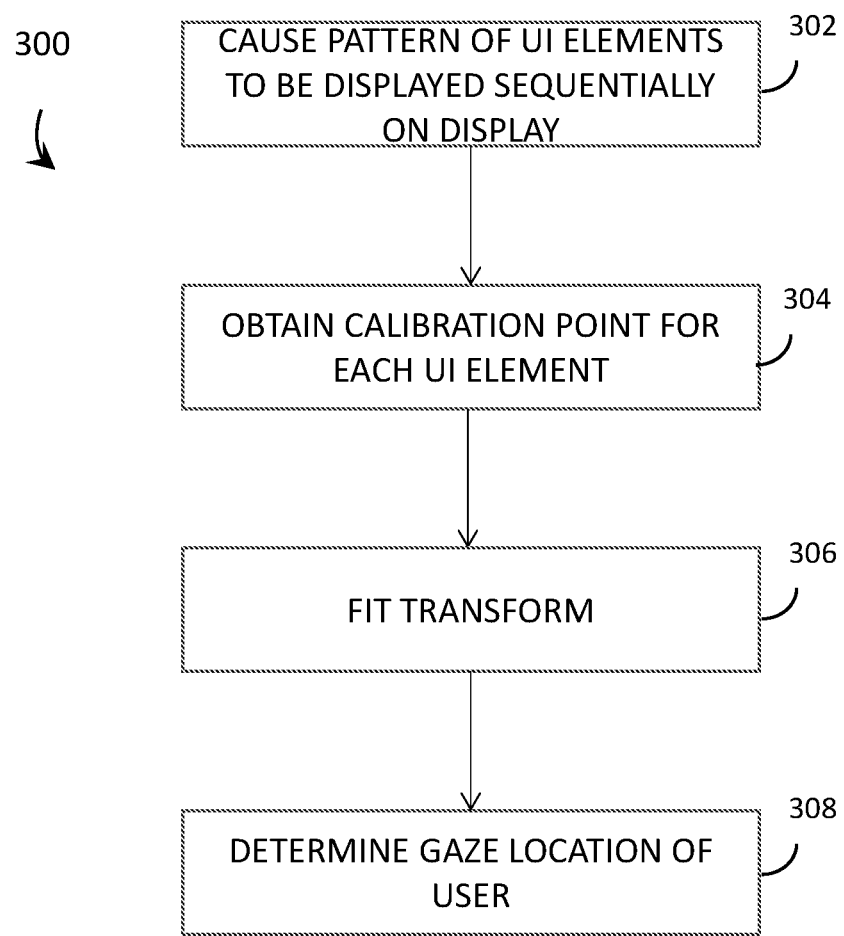
FIG. 3 is a flowchart for a method of operation of an eye tracking system of a wearable heads-up display to perform an explicit calibration process, in accordance with the present systems, devices, and methods.

FIG. 3 shows a method 300 of operation for a WHUD to perform explicit calibration of an eye tracking process. As an example, the method 300 may be implemented by the WHUDs 100 and 200 or FIGS. 1 and 2, respectively.

At 302, at least one processor of the WHUD may cause a pattern of UI elements (e.g., four UI elements, 8 UI elements) to be displayed sequentially on the display of the WHUD. As a non-limiting example, four UI elements may be displayed sequentially, one UI element at a different location (e.g., one UI element in each corner) of the display. At 304, for each UI element displayed and selected (e.g., clicked on) by the user, the at least one processor may obtain a calibration point. Each calibration point may include a glint space point $P_g$ in glint space obtained from a glint detection module (see FIG. 5) of the WHUD, and a corresponding display space point $P_d$ in display space of the display that corresponds to the location (e.g., center location) of the UI element displayed and selected by the user. A calibration point represents an instant in time when a glint detection module produced a glint space point $P_g$ while the user was gazing at a display space point $P_d$. As discussed below with reference to FIG. 5, the display space point may be received by the at least one processor from a UI layer of the WHUD.

At 306, the at least one processor of the WHUD may fit a transform (e.g., affine transform) using the four calibration points by translating, rotating, shearing, and scaling the approximate parallelogram of the glint space to align with the rectangular shape of the display in display space.

At 308, the at least one processor may utilize the transform to subsequently determine the gaze location of the user. For example, the at least one processor may subsequently receive a glint space point from the glint detection module, and may transform the glint space point to a display space point using the transform to determine the location on the display of the WHUD where the user is currently gazing, which allows the user to interact with the WHUD using his or her eye.

Figure 4:
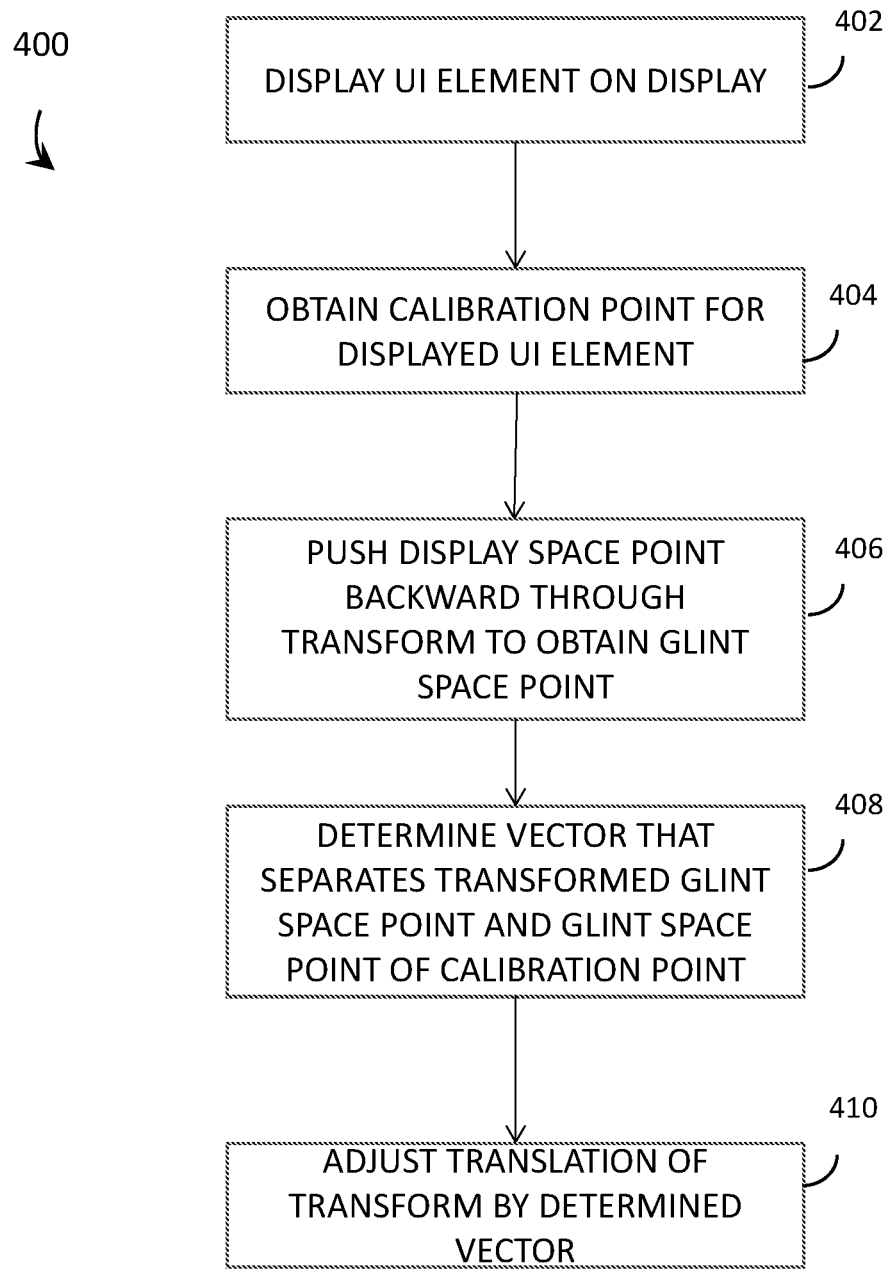
FIG. 4 is a flowchart for a method of operation of an eye tracking system of a wearable heads-up display to perform an explicit 1-point re-centering of an explicit calibration process, in accordance with the present systems, devices, and methods.

FIG. 4 shows a method 400 of operation for a WHUD to perform 1-point re-centering of a calibration, such as the calibration discussed above with reference to the method 300 of FIG. 3.

At 402, the at least one processor of the WHUD may display a UI element, for example, during a calibration process or during regular use of the WHUD by the user.

At 404, the at least one processor may obtain a calibration point comprising a glint space point and a display space point representative of the location of the UI element displayed on the display. The glint space point may be received from the glint detection module and the display space point may be received from the UI layer of the WHUD, for example. In at least some implementations, the at least one processor may assume that the user is gazing at the center of the UI element when the UI element is selected (e.g., "clicked") by the user.

At 406, the at least one processor may push the display space point of the calibration point backward through the transform (e.g., affine transform) into glint space to obtain a transformed glint space point. The resulting transformed glint space point in glint space is likely not exactly equal to the glint space point from the calibration point detected by the glint detection module.

At 408, the at least one processor may determine a vector that separates the transformed glint space point with the glint space point of the calibration point.

At 410, the at least one processor may adjust the translation of the transform by the determined vector that separates the two glint space points so that the transform maps the glint space point exactly to the display space point, and hence perfectly fits the calibration point.

From a user experience (UX) perspective, it may be advantageous to minimize the frequency of explicit calibration and to support use-cases involving physical movement (e.g., walking, running, biking). Thus, in at least some implementations, a transform may be updated using a stream of incoming, arbitrary calibration points, to account for changes in the relationship between glint space and display spaces with respect to rotation, shear, scale and translation due to movement of the support frame of the WHUD. As discussed further below, such implementations may determine distinctions between selected calibration points, which may have higher confidence, may be older, and may be global, and inferred calibration points, which may have lower confidence, may be newer, and may be local. In at least some implementations, alternate transforms may be maintained based on combinations of these calibration points. Further, inferred calibration points may be used to assist with calibration recovery.

In at least some implementations, the at least one processor of the WHUD may assign a probability to each UI element on a display based on the current transform(s) and other information (e.g., UI layout, predictive models) as opposed to using the current transform to provide a gaze location to the UI layer, which decides whether to highlight a UI element based on a distance threshold.

As discussed above with reference to FIG. 2, in at least some implementations a WHUD may be equipped with one or more auxiliary sensors, such as a proximity sensor, a gyroscope, an accelerometer, a stereo camera, an inertial measurement unit (IMU), etc. Such auxiliary sensors may be used to assist with calibration of the eye tracking system of a WHUD.

Figure 5:
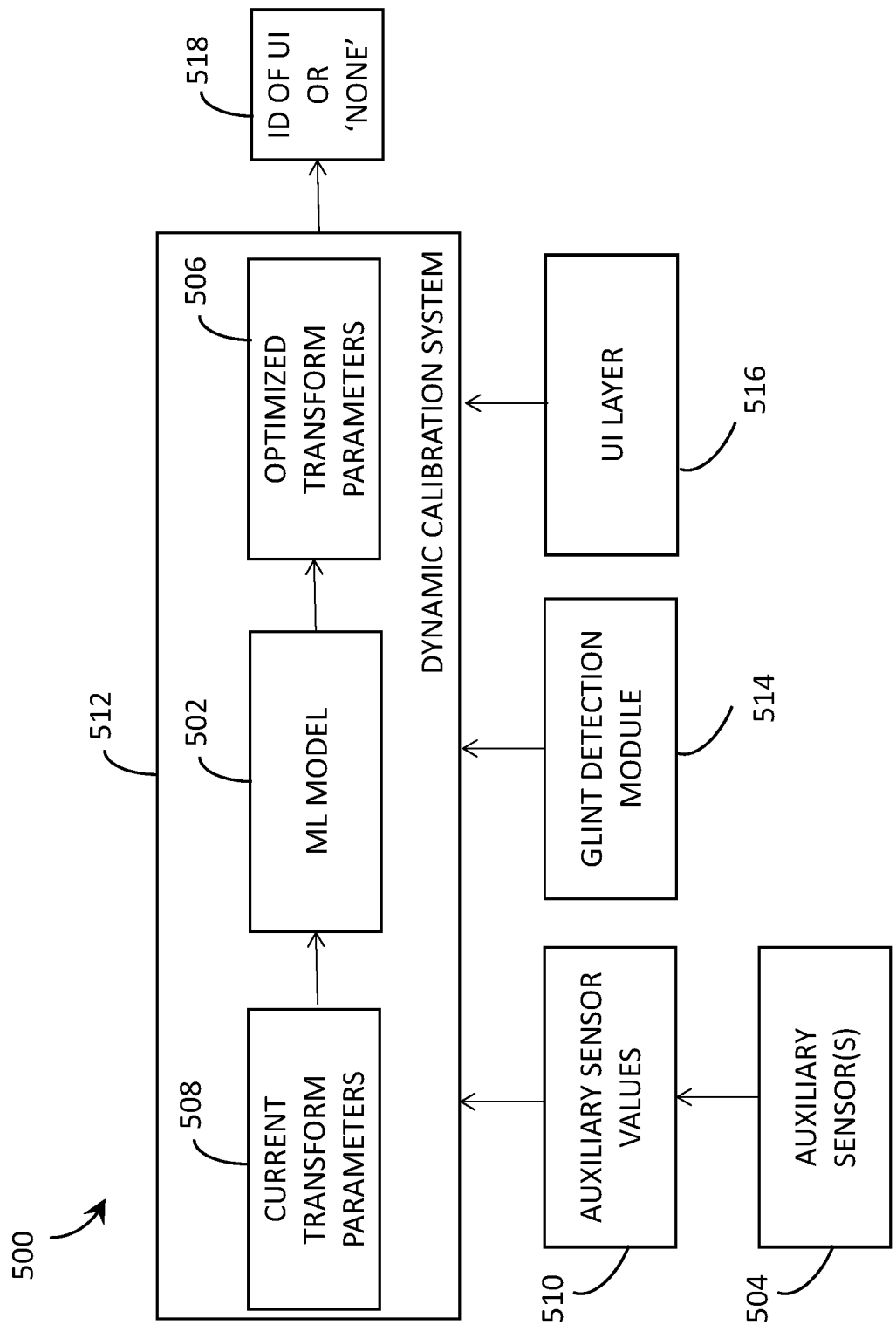
FIG. 5 is a functional block diagram of an eye tracking system of a wearable heads-up display that utilizes a machine learning model to improve a dynamic calibration scheme, in accordance with the present systems, devices, and methods.

FIG. 5 shows a block diagram of an eye tracking system 500 of a WHUD that utilizes a machine learning model 502 of a dynamic calibration system 512 to implement a dynamic calibration scheme. In at least some implementations, one or more auxiliary sensors 504 may be used to train the machine learning model 502 that outputs optimized transform parameters 506 given current transform parameters 508 and current auxiliary sensor values 510 from the one or more auxiliary sensors 504. The optimized transform parameters 506 may then be utilized by the dynamic calibration system 512 to improve gaze detection confidence. As indicated by an output block 518, the dynamic calibration system 512 may output the identity of a UI element, or may provide a "none" output if gaze confidence is too low.

As discussed above, the dynamic calibration system 512 may interface with a glint detection module 514 and a UI layer 516 of the WHUD. For example, the glint detection module 514 may provide glint information (e.g., glint space points) to the dynamic calibration system 512. The UI layer 516 may provide display information to the dynamic calibration system 512, including the location of UI elements displayed on the display of the WHUD. Such information may be used to perform the calibration schemes discussed herein. Additionally, the dynamic calibration system 512 may instruct the UI layer 516 to highlight a UI element based on a determined gaze location.

In at least some implementations, this feature may utilize population data as well as particular user data collected during an initial explicit or implicit calibration process. In at least some implementations, the resulting machine learning models may be fine-tuned by user data collected during regular everyday use of the WHUD by the user without the user being aware of such.

Figure 6:
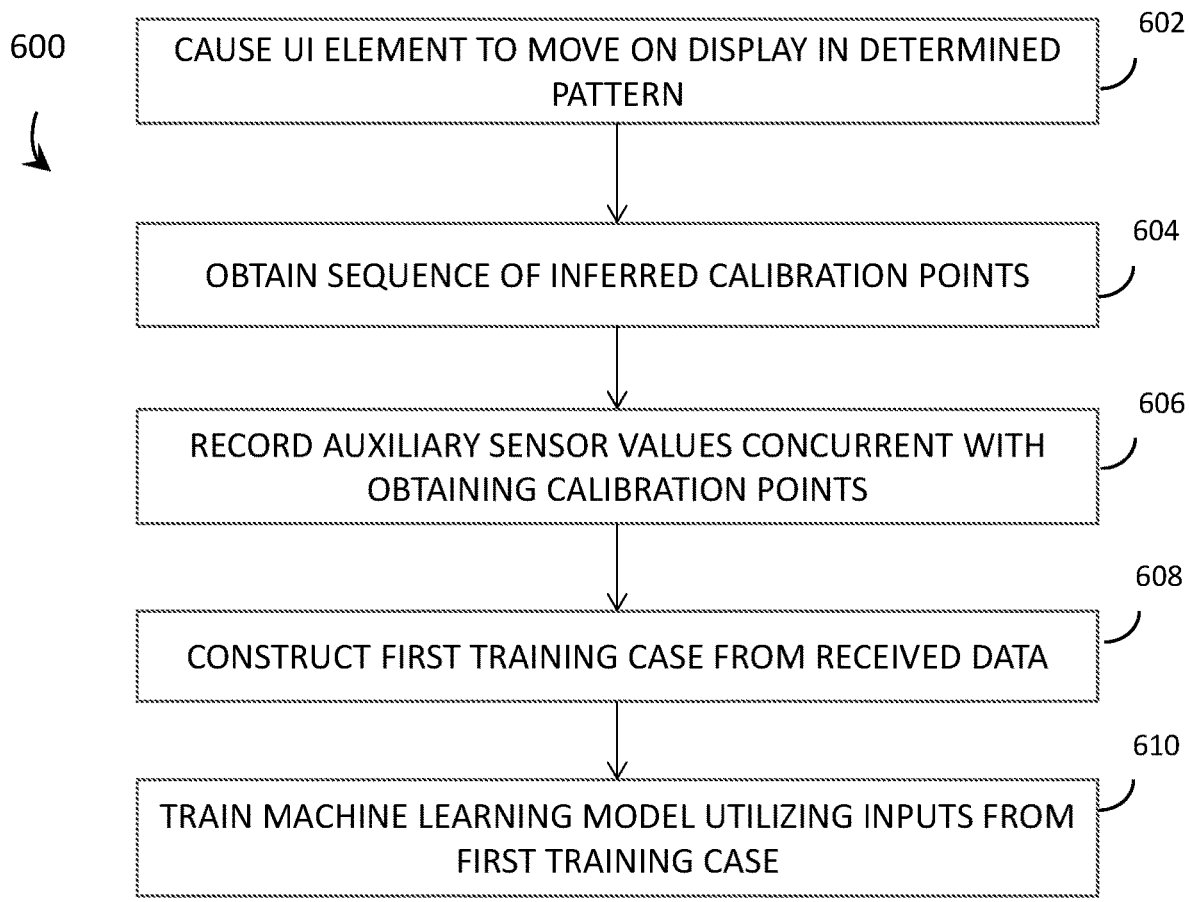
FIG. 6 is a flowchart for a method of operation of an eye tracking system of a wearable heads-up display to obtain training data and to train one or more machine learning models using the obtained training data, in accordance with the present systems, devices, and methods.

FIG. 6 shows an example method 600 of operation for a WHUD to perform an initial explicit calibration of the eye tracking system of the WHUD that generates an extensive amount of high quality training data in a very short time, and facilitates training of machine learning models (e.g., machine learning model 502 of FIG. 5) to optimize affine transform parameters.

At 602, at least one processor of the WHUD may cause a UI element to move in a determined pattern (e.g., rectangular pattern) on the display of the WHUD (e.g., around a perimeter of the display). In at least some implementations, the at least one processor may cause the UI element to reverse directions periodically.

At 604, the at least one processor may obtain a sequence of inferred calibration points over a period of time (e.g., 30 seconds, 60 seconds) as the UI element moves on the display according to the determined pattern. Each inferred calibration point may include a glint space point captured by the glint detection module and a display space point representative of the location on the display at which the UI element was positioned when the glint space point was captured by the glint detection module, which is also the location that the gaze of the user is inferred to be resting.

At 606, concurrent with obtaining each calibration point, the at least one processor may record one or more auxiliary sensor values and a timestamp, and may logically associate such with the concurrently-obtained calibration point in a nontransitory processor-readable storage medium of the WHUD. Thus, the at least one processor may store a plurality of calibration points which each comprise a display space point, a glint space point, and one or more auxiliary sensor values. In at least some implementations, the at least one processor may detect and remove outliers from the data.

At 608, the at least one processor may construct a first training case from the received data. A training case is a set of calibration points and their associated auxiliary sensor values. In at least some implementations, the at least one processor may ensure that calibration points that are maximally distant from each other are chosen for each training case. FIG. 7 shows a non-limiting example of a plurality of inferred calibration points (in display space) on a display 700 of the WHUD obtained during the acts 602-606 discussed above. In the example of FIG. 7, the UI element moves in a counterclockwise direction in a rectangular pattern. In other implementations, the UI element may move in various other patterns. Patterns that include corners (e.g., 90 degree angle corners) may be advantageous because they cause the user's eye to change direction, which change can be readily detected by the glint detection module.

In this example, the at least one processor may select three inferred calibration points A, B and C that lie closest to the bottom left corner, the bottom right corner, and the top right corner, respectively. In other implementations, more or fewer calibration points may be obtained at various locations on the display. Continuing with the above example, the three inferred calibration points A, B and C were obtained in fairly quick succession as the UI element moved along the display in the counterclockwise rectangular pattern from point A to point B to point C, etc. A number of additional points A+1, A+2, and A+3 may be sequentially obtained between point A and point B, and a number of additional points B+1, B+2, and B+3 may be sequentially obtained between point B and point C. Further, a number of points C+1, C+2, etc., are obtained sequentially after point C was obtained.

The at least one processor may fit a transform (e.g., affine or other transform) to points A, B and C and all points obtained between points A, B and C. If these points were captured during significant physical movement by the user of the WHUD, the points may contain a significant amount of noise. However, fitting the transform to a larger number of points than the minimum points A, B and C reduces the impact of this noise, and produces a more accurate transform.

The at least one processor may obtain the auxiliary sensor values $S_C$ recorded at the same time that point C was obtained. These auxiliary sensor values $S_C$ capture the physical state of the WHUD at the end of the time window spanned by the calibration points used to generate the affine transform.

The at least one processor may also obtain the auxiliary sensor values recorded at the same time that points A, B, and C, and all points therebetween, were obtained. The at least one processor may compute the average of each auxiliary sensor value, $S_{AvG}$, over these time points, which captures the average physical state of the WHUD over the time window spanned by the calibration points used to generate the affine transform.

The at least one processor may then select the inferred calibration point C+1 that was obtained immediately after the calibration point C was obtained, and obtain the auxiliary sensor values $S_{C+1}$ recorded at the same time that the point C+1 was obtained. These auxiliary sensor values $S_{C+1}$ capture the current physical state of the WHUD, which is the context for which the affine transform parameters of the current affine transform should be optimized.

The at least one processor may subtract $S_C$ from $S_{C+1}$ to obtain auxiliary sensor value deltas that represent how auxiliary sensor values have changed since the end of the time window spanned by the calibration points used to generate the transform. These auxiliary sensor value deltas may be inputs to the machine learning model.

The at least one processor may also subtract $S_{AvG}$ from $S_{C+1}$ to obtain auxiliary sensor value deltas that represent how auxiliary sensor values have changed with respect to the average auxiliary sensor values during the time window spanned by the calibration points used to generate the transform. These auxiliary sensor value deltas may also be inputs to the machine learning model.

The glint space and display space points from the point C+1 may then be used to evaluate the machine learning model performance on the generated training case.

At 610, the at least one processor may utilize the inputs from the training case to train a machine learning model to output six optimized affine transform parameters.

In at least some implementations, the at least one processor may ensure that the points A, B and C have "traveled around the display," and are roughly evenly distributed. In at least some implementations, the at least one processor may ensure that roughly half of the training data was captured in a counterclockwise scenario, as shown in FIGS. 7 and 8, and the other half was captured in a clockwise scenario. Capturing a large volume of symmetrical, granular training data in this fashion may help the machine learning model learn to compensate for significant high-frequency physical movement.

In at least some implementations, the best of these training cases may be contributed to a large database of training data obtained from the initial calibration of many users. Further, a machine learning model may be trained on each of these sets of training cases (population and user). Additionally, a weighted mixture of these two models may be determined that optimizes performance on the user's training data.

In at least some implementations, the at least one processor may instruct the user to repeat the initial explicit calibration process in different determined user modes (e.g., slowly moving user's head, talking, walking, running). For each user mode, the at least one processor may obtain a new set of training cases, contribute to a population model, train machine learning models, and optimize a mixture model, as discussed above. Using training cases from all user modes, the at least one processor may train and optimize a new mixture model that predicts the current user mode from auxiliary sensor values. This model can then select the current user-mode-specific mixture model (or a weighted combination thereof) to optimize transform parameters.

In at least some implementations, during everyday use of the WHUD, the at least one processor of the WHUD may store selected calibration points in the same way that inferred calibration points are stored during initial explicit calibration. The at least one processor may use these calibration points to augment population models, optimize mixture model parameters, and to periodically retrain user models.

Figure 9:
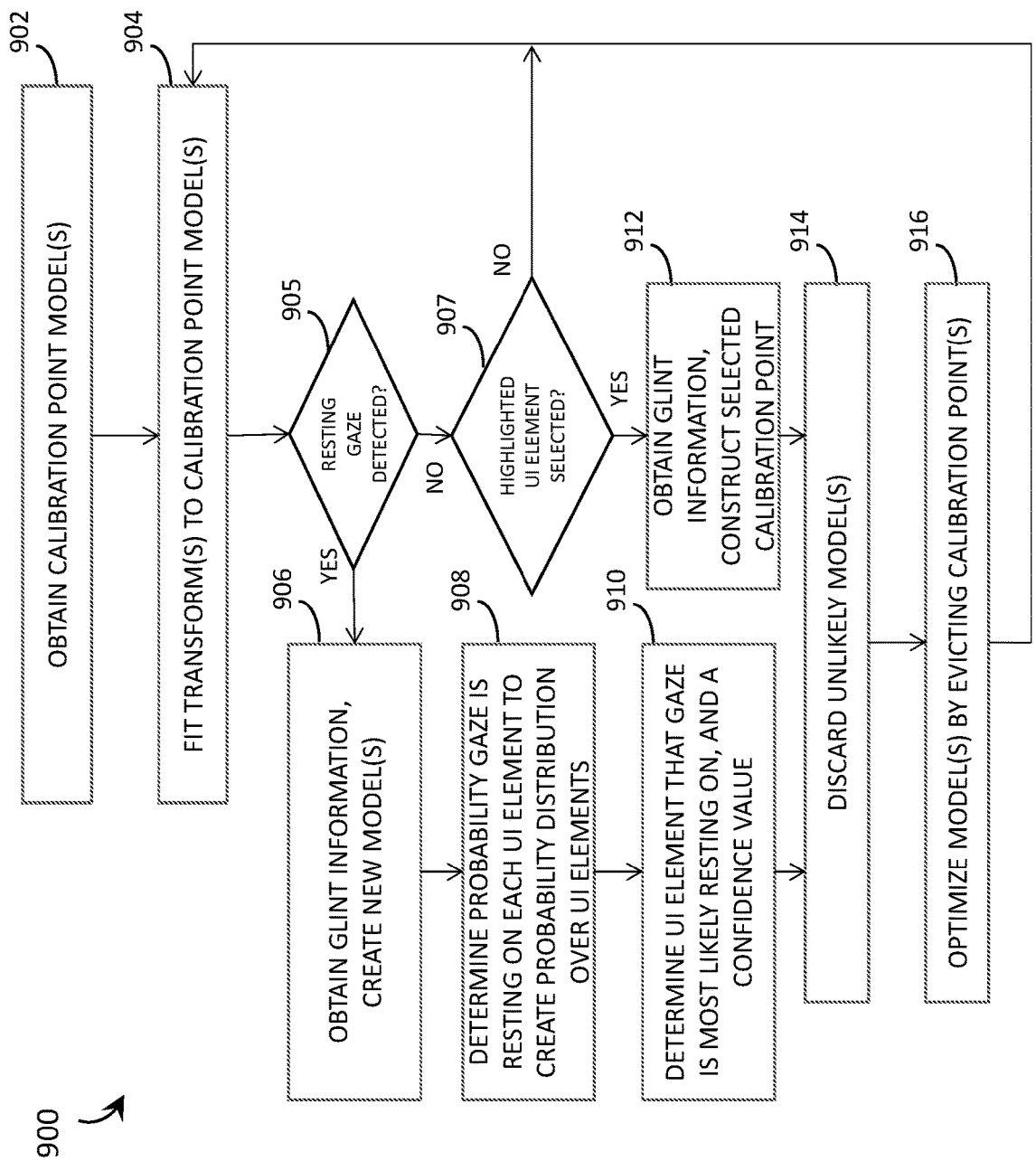
FIG. 9 is a flowchart for a method of operation of an eye tracking system of a wearable heads-up display that implements a dynamic calibration scheme, in accordance with the present systems, devices, and methods.

FIG. 9 shows a method 900 of operation for a WHUD to provide dynamic calibration of an eye tracking system of the WHUD. As an example, the method 900 may be implemented by the WHUDs 100 and 200 of FIGS. 1 and 2, respectively.

At 902, at least one processor of the WHUD may obtain a calibration point model $M_1$ ($<P_g, P_d>_1, \ldots, <P_g, P_d>_N$), where $P_g$ is a point in glint space, $P_d$ is a point in display space, and N is the number of calibration points in the model $M_1$. Each calibration point may include a glint space point in a glint space and a display space point in a display space of a display of the WHUD, as discussed above. The glint space point may be captured by a glint detection module of the WHUD, and may be representative of a position of an eye of a user of the WHUD, as discussed above. The display space point may be representative of a location on the display at which a gaze of the user is inferred to be resting when the glint space point is captured by the glint detection module. As discussed above, in implementations wherein auxiliary sensors are utilized, at least some of the calibration points may also include auxiliary sensor values.

In at least some implementations, the at least one processor may obtain a calibration point model by causing the display to generate an interaction start screen that supports explicit and/or implicit calibration. When the interaction start screen is enabled, the screen will populate a calibration point model $M_1$ with high quality calibration points which provides a best-case starting point for dynamic calibration.

In at least some example implementations, the interaction start screen may contain five selectable UI elements (e.g., round UI elements), located at the four corners and the center of the display. In an explicit calibration mode, the at least one processor may present the corner UI elements sequentially one at a time, and may require the user to gaze and select (e.g., click on) each one of the UI elements. Each UI element may change color briefly when a selection occurs, even though the UI element was not highlighted. The dynamic calibration system achieves high gaze confidence from these four selected calibration points, and will then exit a calibration recovery mode, which enables UI element highlighting. The at least one processor may then cause the center UI element to be displayed on the display. Once the user gazes on the center UI element and the center UI element is highlighted, selecting the center UI element allows the user to continue with the interaction.

In an implicit calibration mode, the at least one processor may present all UI elements (e.g., five UI elements) simultaneously on the display. The user may be allowed to shift gaze between the UI elements until the dynamic calibration system achieves adequate gaze confidence and exits calibration recovery mode, thereby enabling UI element highlighting. Once the user gazes on the center UI element and the center UI element is highlighted, selecting the center UI element allows the user to continue with the interaction.

In at least some implementations, the at least one processor may obtain a base calibration model that most closely corresponds to current auxiliary sensor values. As discussed above with reference to FIG. 6, such may be obtained from a stored library, for example.

In at least some implementations, the at least one processor may obtain a plurality of calibration point models at a given time. For example, the at least one processor may utilizes a mixture of models to make a prediction that will be more reliable than the prediction of any one model. More specifically, between selections, the at least one processor has to infer the sequence of UI elements that the user's gaze traversed, and each model represents a different inference.

Thus, after the act 902, the system has obtained a one or more calibration point models.

At 904, the at least one processor may generate a transform from the glint space to the display space for each of the one or more models using any suitable transform method. In at least some implementations, an affine transform $T_1$ is used to generate the transform from the glint space to the display space for each of the models.

The following discussion provides a non-limiting example algorithm for computing an affine transform $T_i$ from a calibration point model $M_i$. A variable numCalibrationPoints may be defined as the length of the model $M_i$. A (numCalibrationPoints*2×6) matrix A may be constructed, where:

$$A_j = [x_{gj} y_{gj} 0 0 1 0]$$

$$A_{j+1} = [0 0 x_{gj} y_{gj} 0 1]$$

A (numCalibrationPoints*2×1) vector b may be constructed, where:

$$b_j = x_{dj}$$

$$b_{j+1} = y_{dj}$$

The at least one processor may solve (e.g., least squares) for the 6×1 vector p, the parameters of the affine transform $T_i$, using the QR decomposition (QRD) or singular value decomposition (SVD) method. Let $T_i(x_g, y_g) = (p_1 * x_g + p_2 * y_g + p_5, p_3 * x_g + p_4 * y_g + p_6) = (x_d, y_d)$.

The QRD method may be used to determine the parameters of the affine transform, as the QRD method may offer the best time complexity and good numerical stability. For applications that may require more advanced functionality, such as the ability to weight calibration points and/or to ignore outliers, the SVD method may be used.

Thus, after act 904, the system has fit $T_1$ to $M_1$. As discussed above, $T_1$ is the affine transform from glint space to display space that hypothesis $M_1$ predicts is the current transform.

At 905, if the at least one processor may detect whether the user's gaze is resting (e.g., for a period of time).

If the at least one processor detects that the user's gaze is resting, at 906 the at least one processor may obtain glint information from the glint detection module and create new models as needed. More specifically, the at least one processor may branch each existing model by appending an inferred calibration point for each UI element displayed on the display to create (numModels*numUIElements) new child model(s), which replace the previous parent model(s). For example, if the system has three parent models and the display has 10 UI elements displayed, the at least one processor generates 30 child models, 10 child models for each of the three parent models. Each of the child models includes a new calibration point appended to the child model's parent model. The new calibration point includes a glint space point obtained from the glint detection module and a display space point that corresponds to the one of the UI elements with which the child model is associated. Thus, each of the new calibration points have the same glint space points and different display space points.

At 908, the at least one processor may utilize the models to determine the probability that the user's gaze is resting on each UI element. Specifically, the at least one processor may compute the total probability of the user's gaze resting on each UI element, a function of model probabilities, to create a probability distribution over the UI elements displayed on the display.

At 910, the at least one processor may determine the one UI element displayed on the display that the user's gaze is most likely resting on, and may determine a "confidence value" that the user's gaze is resting on that UI element. Specifically, the at least one processor may utilize the determined probability distribution to determine the UI element with the most probability. The features of the probability distribution as a whole may be used to define the confidence value. If gaze confidence is high enough (e.g., above a threshold), the UI may highlight that UI element, which indicates to the user that the system has detected that the user's gaze is focused on that UI element.

Returning back to act 905, if the at least one processor does not detect that the user's gaze is rested, at 907 the at least one processor may detect whether a highlighted UI element has been selected (e.g., clicked on).

If a highlighted element has been selected, at 912 the at least one processor may obtain glint information from the glint detection module, and may construct a selected calibration point <$P_g$, $P_d$> that includes a glint space point from the glint detection module and a display space point that corresponds to the location on the display of the selected UI element. The display space point $P_d$ may be inferred to lie at the center point of the highlighted UI element. $T_i(x_g, y_g)$ may not necessarily equal the display space point $P_d$, due to transform error, movement of the support frame since $T_i$ was computed, and/or other error. However, $T_i(x_g, y_g)$ should be close to the display space point $P_d$ for the most probable models $M_i$.

In at least some implementations, selections are ignored if a UI element is not highlighted. In at least some implementations, the obtained selected calibration point may be used to discard models that did not predict that the user's gaze is resting on the current UI element. In other words, the selected calibration point may be used as the "confirmation" that can be used to assess past inferences.

To minimize the impact of accidental gaze shift before a selection, if a selection occurs while gaze is not being held, a short time after gaze was resting on a selectable UI element (e.g., determined by a time threshold), the at least one processor may assume that the user shifted gaze just prior to the selection. The at least one processor may associate the selection with the previous UI element, register the selection as usual, and obtain a selected calibration point. If the reset action occurs a short time after obtaining a selected calibration point (e.g., determined by a time threshold), the user may have selected a highlighted UI element while not gazing at it. In such instances, the at least one processor may remove the selected calibration point prior to proceeding with calibration at interaction start. If a "dubious" selected calibration point is obtained (e.g., determined via an algorithm and/or a separate ML module), the system may choose to ignore it. This feature minimizes the impact of unintended selections, and reduces the need for the reset action as described above.

At 914, the at least one processor may discard one or more unlikely models. In at least some instances, it may be too computationally expensive to retain all models. In a "resting gaze" case, the at least one processor may use various approaches to determine which models to discard. For example, the at least one processor may keep the most probable N number of models, may keep those models above a probability threshold, etc. In a "clicked" case, the at least one processor may retain a single model that becomes model $M_1$, the most probable model that ends with a calibration point corresponding to the UI element that was clicked. As another example, the at least one processor may retain a small number of models that end with this calibration point. As another example, the at least one processor may replace the last inferred calibration point in these models with the obtained selected calibration point, or an average of the two. After discarding one or more models, the at least one processor may normalize model probabilities such that the probability of the remaining, non-discarded models, sums to 1.

At 916, the at least one processor may optimize the one or more models by evicting zero or more calibration points. After the one or more models have been optimized, control may return to act 904, and the process may iterate continuously until the end of the interaction.

The following discussion provides a number of different strategies that may be used to evict one or more calibration points from a calibration point model.

A positive integer N may be defined as the number of calibration points in a calibration point model $M_i$. Then N must be bounded. $N_{Min}$ and $N_{Max}$ may be defined as the lower and upper bounds, respectively, of N. Therefore, when a new calibration point is added to $M_i$, it may be necessary to evict calibration point(s) from $M_i$ to ensure that N does not exceed $N_{Max}$.

Within these bounds, N may be chosen to optimize dynamic calibration performance for the current user in the current context. Choosing $N=N_{Min}$ causes $T_i$ to fit the most recent $N_{Min}$ calibration points the best. But it may be desirable for $T_i$ to fit the most recent $N_{Min}<=K<=N_{Max}$ calibration points, such that the amount of movement of the support frame that occurred during capture of the calibration points is minimal, and the distribution of the points in glint space is maximal. The former may be more important than the latter. It is noted that evicting calibration point(s) from one or more models may cause multiple, previously unique models to contain the same sequence of calibration points. If this occurs, duplicate models may be discarded.

$N_{Max}$ is defined by the transform. For example, $N_{Min}$ is equal to three for an affine transform, and is significantly more for a nonlinear transform. If N is smaller than $N_{Min}$, $T_i$ cannot be computed. If this is the case, the system may be in calibration recovery mode, discussed below.

$N_{Max}$ is defined by the hardware of the WHUD, and the time complexity of the dynamic calibration algorithm. If N becomes too large, the system will not be able to keep up with gaze input from the glint detection module. In at least some implementations, a value for $N_{Max}$ (e.g., 5, 7, 10) may be determined via experimentation. The value for $N_{Max}$ may be selected to ensure that this value is safely smaller than a value that would begin to cause a slowdown. In at least some implementations, a developer configuration option may be provided to allow adjustment of $N_{Max}$. Any manipulation of a model $M_i$ must ensure that N adheres to these bounds.

Many approaches to evicting calibration points from $M_i$ are possible. Any such approaches may rely on an assumption that gazeable/selectable UI elements are reasonably distributed throughout the display, and salience is reasonably distributed throughout the display. Such approaches may also rely on an assumption that movement of the support frame of the WHUD affects calibration accuracy more than transform error.

One approach evicts the oldest point(s) from $M_i$ to ensure that N is less than or equal to $N_{Max}$. Such an approach is simple, computationally cheap, and works well in practice. The oldest point(s) are evicted without considering the distribution of calibration points in $M_i$. Further, since $M_i$ spans a time window where no calibration points have been removed, the distribution of calibration points in $M_i$ is expected to be fairly even, without any explicit intervention from the algorithm. Further, N can be adjusted to manipulate the size of this time window, allowing transform fit to vary smoothly between temporally recent, spatially local and temporally historical, spatially global. In at least some implementations, N may be adjusted dynamically (e.g., via algorithm and/or a separate ML module) to optimize $M_i$ and $T_i$ for the current context and user mode.

For some applications, a more complicated eviction strategy than that described above may be desirable to achieve good dynamic calibration performance in user modes involving physical movement.

Strategies that evict solely to optimize point distribution may not be successful, and may suffer from several issues. Generally, evicting to optimize point distribution should have lower priority than evicting to minimize the amount of physical movement that occurred during capture of the points in $M_i$, since it is assumed that movement of the support frame of the WHUD affects calibration accuracy more than transform error. Further, evicting to optimize point distribution may not be necessary, since gazeable/selectable UI elements may be reasonably distributed throughout the display. Further, old calibration points could heavily skew $T_i$. Additionally, gaze sequences may be local, causing recent valuable calibration points to be evicted. The system may remove the most recent K calibration points from eligibility for eviction to help mitigate this issue, but such may require selection of K to weight priority between point recency and point distribution.

In at least some implementations, an eviction approach is used that optimizes $T_i$'s fit to the current selected point, or a subset of $M_i$ including the current selected point.

According to another eviction approach, the display may be divided evenly (e.g., divided into a grid). The system may maintain one calibration point per region, evict existing calibration points in a region, and refit $T_i$ with the new calibration point.

According to another eviction approach, the at least one processor may evict a nearest neighbor of the newly obtained calibration point if closer than a distance threshold, and then refit $T_i$.

According to another eviction approach, the at least one processor may place importance weights on having recent points versus having an even point distribution. The at least one processor may compute an improvement value that results from evicting each calibration point given its age and location, and evict the calibration point that realizes the highest improvement value. The at least one processor may then refit $T_i$.

According to another eviction approach, the at least one processor may evict a nearest neighbor if it is closer than a distance threshold, and subsequent neighbors, in order from closest to farthest, if doing so continues to improve $T_i$'s fit to the current selected calibration point. The at least one processor may then refit $T_i$. This approach eliminates calibration points that are close to and inconsistent with the current selected calibration point (i.e., not recent). However, it may be desirable to eliminate calibration points that are distant and not recent as well.

According to another eviction approach, the at least one processor may refit $T_i$, evict a calibration point that $T_i$ fits the worst, and then refit $T_i$. After a significant movement of the support frame of the WHUD, the calibration point that $T_i$ fits the worst may be the most recent calibration point. This may be prevented programmatically. When a second calibration point is subsequently obtained, the first calibration point would be the second-most-recent calibration point, which would be more accurate than any of the other calibration points sets except for the current (second) calibration point. In at least some implementations, the system may detect when a significant movement of the support frame has occurred, and switch to evicting the oldest calibration point(s) temporarily.

According to another eviction approach, the at least one processor may refit $T_i$, evict point(s) that $T_i$ fits worse than a threshold, and then refit $T_i$.

According to another eviction approach, the at least one processor may start with the $N_{Min}$ most recent points, excluding the current selected point, grow a calibration point toward the end of $M_i$, and fit a new transform to the points in the set each time. The at least one processor may evaluate how well each of these transforms fits the current selected point. The at least one processor may select the best transform, let $M_i$ consist of the points that this transform was fitted to, and then refit $T_i$. The transform that fits the current selected point the best will likely be the one fitted to the $N_{Min}$ most recent points, excluding the current selected point.

Another eviction approach is similar to the one discussed immediately above, but the at least one processor may evaluate fit against the current selected point and all of the points in the set. This approach may produce a transform that generalizes better than above.

Another eviction approach is similar to the two approaches discussed immediately above, except the at least one processor may grow the set excluding the first K points in addition to the current selected point. The at least one processor may evaluate how well each of the transforms fits the excluded points and all of the points in the set.

According to another approach, at least one proximity sensor value from at least one proximity sensor may be used to determine whether the new point is close enough to the previous point(s). In at least some implementations, the at least one processor may store all the points according to what the proximity sensor value(s) was/were for those points, then recall the set of stored points which correspond to the new point's proximity sensor bucket(s).

Generally, a hybrid eviction approach that prioritizes maintaining recent points and a good point distribution, while using an estimation method to predict eviction impact (to minimize reliance on transform fitting) may be effective. Further, an eviction approach that minimizes the assumption that gazeable/selectable UI elements are reasonably distributed throughout the display may be beneficial. Such may be achieved if the eviction strategy maintains adequate gaze confidence in a scenario where the user shifts gaze from UI element A to distant UI element B, then to nearby UI element C, then back and forth between UI element B and UI element C many times, then back to UI element A.

Due to continuous movement of the support frame with respect to the eye, user gaze location can only be known for certain at the instant the user selects (e.g., clicks on) a highlighted UI element. At all other times, gaze location must be inferred. As discussed above with reference to act 910 of FIG. 9, the system may assign a gaze confidence to a gaze inference to determine whether UI element highlighting should be enabled or disabled. To be effective, this confidence value may depend on the UI neighborhood surrounding the inferred element, and hence the probabilities of alternate inferences. For example, if the UI neighborhood surrounding the inferred UI element is sparse, the confidence value may be higher. Conversely, if the UI neighborhood is dense, the confidence value may be lower. Therefore, a probability distribution may be defined, and the maximum likelihood inference and a gaze confidence may be determined via this probability distribution. This probabilistic approach allows a variable scope and depth of context to be considered, but defines probabilities relative to the entire context. A simple (e.g., geometric distance-based) or arbitrarily complex (e.g., input from predictive models and auxiliary sensors) probability distribution may be implemented.

A probability distribution GP may be defined over all currently gazeable/selectable UI elements E that defines the probability that the user is currently gazing at each UI element $E_k$.

The following discussion provides several different approaches for extending calibration point models. As discussed above, if a selected calibration point was just obtained, the only model that exists is $M_1$, which ends with the most recent selected calibration point. Otherwise, a number of models $M_i$ may exist, each containing a sequence of calibration points. Some models may begin with a common sub-sequence of calibration points (e.g., descendants of a common ancestor or parent model). However, no two models contain the same sequence of calibration points (e.g., each model makes at least one unique inference).

Allow numElements to be the number of currently gazeable/selectable UI elements $E_k$. As discussed above, for each parent model $M_i$, the at least one processor may create numElements child models that extend $M_i$, where an inferred calibration point $<P_g, P_d>$ is appended to the jth child model, such that $P_d$ is the center point of UI element $E_j$. Such branches and extends the hypothesis represented by $M_i$ to cover all possible current gaze scenarios. The system then has many child models. The at least one processor may move the parent models into a separate set P, let the child models constitute M, and ensure that each child model references its parent model. A probability may be assigned to each child model. Intuitively, a child model's probability may be a function of its parent model's probability, among other variables.

The following discussion provides example implementations of defining model probabilities. Per Bayes' Rule:

$$P(\text{Model}|\text{Data}) = (P(\text{Model}) * P(\text{Data}|\text{Model}))/P(\text{Data})$$

A model $M_i$ includes $M_i.P_g$ and $M_i.\text{Element}$, which correspond to the most recent inferred calibration point. The data, which comprises a sequence of calibration points, the last K of which have been inferred, are $M_i$'s parent model's data, its sequence of calibration points and its transform, which has been fitted to this sequence.

Then the probability of a model $M_i$ given the data can be defined as follows:

$P(M_i|M_i.\text{Parent.Data})=(P(M_i.\text{Parent})*$
$P(M_i.\text{Parent.Data}|M_i))/\Sigma_j(P(M_j.\text{Parent})*$
$P(M_j.\text{Parent.Data}|M_j))$ The prior probability of a model $M_i$ is the probability of its parent model. The likelihood of the data given a model $M_i$ can be defined as follows:

$P(M_i.\text{Parent.Data}|M_i)=f(M_i.\text{Parent.Data},M_i.P_g,M_i.\text{Element})*g(M_i.\text{Parent.Data},M_i.\text{Element})$ The at least one processor may define a function $f(M_i.\text{Parent.Data}, P_g, \text{Element})$ with range [0, 1] as follows:

$f(M_i.\text{Parent.Data},P_g,\text{Element})=1-((\text{Element.Centerpoint}-\text{ensureOnDisplay}(M_i.\text{Parent.Data.Transform}(P_g)))^2/\text{Element.MaxDistToCornerSquared})$ The above approach uses $M_i$'s parent's transform to map $P_g$ into display space to produce $P_d'$. If $P_d'$ lies outside of the display, the method ensureOnDisplay ($P_d'$) constructs a line between $P_d'$ and the center of the display, finds the intersection of this line and the closest display edge, and adjusts $P_d'$ to lie at this intersection. This approach computes the squared distance error between the center point of Element ($P_d$) and $P_d'$. Another approach may compute all of the $T_i(P_g)$ first, find the maximum squared distance error, and use this as the maximum for the current resting gaze when computing all model probabilities.

The above approach takes this as a fraction of the maximum possible squared distance error (i.e., the distance between the center point of Element and the farthest display corner squared, a constant value). If this fraction approaches 1, error approaches the maximum. If this fraction approaches 0, error approaches the minimum. Therefore, this fraction is subtracted from 1 to produce a probability value on [0, 1]. This is the probability that the user is gazing at UI element Element, assuming that all inferred calibration points in $M_i$ are correct.

As discussed above, the at least one processor may leverage input from a separate machine learning module that has learned (e.g., via population and/or user data) to optimize transform parameters given auxiliary sensor input, to optimize $M_i$.Parent.Data.Transform for the current context and user mode prior to applying it to $P_g$. Increasing the accuracy of the transform may allow a more meaningful probability value to be obtained, which reduces the entropy of GP and increase gaze confidence.

The function $g(M_i.\text{Parent.Data}, \text{Element})$ with range [0, 1] may be defined as follows:

$g(M_i.\text{Parent.Data},\text{Element})=1$

In other implementations, the at least one processor may obtain a probability value on [0, 1] from a separate machine learning module that has learned (e.g., via population and/or user data) to predict UI usage patterns (e.g., element gaze and selection counts, typical gaze and selection flows) for a given UI layout in different contexts and user modes. Such module may compute and return:

$P(\text{Element}|M_i.\text{Parent.Data.ElementSequence})$.

Penalizing unlikely element sequences (models) may reduce the entropy of GP and increase gaze confidence, as discussed below.

In at least some implementations, the at least one processor may implement a unigram model that computes the fraction of times that each UI element has been gazed for a given UI layout: P(Element). In other implementations, the at least one processor may implement an N-gram model that computes the fraction of times that each UI element has been gazed/selected after a given short sequence of gaze/selection events for a given UI layout: P(Element|The most recent N−1 elements from $M_i$.Parent.Data.ElementSequence). In at least some implementations, the at least one processor may implement a Hidden Markov Model, recurrent neural networks (RNNs), or a temporal model that computes the probability that each UI element will be gazed/selected after a given longer sequence of gaze/selection events for a given UI layout:

$\sim P(\text{Element}|M_i.\text{Parent.Data.ElementSequence})$

The probability of the data (the denominator) is simply the total probability assigned to all models. This denominator ensures that $\Sigma_i P(M_i|M_i.\text{Parent.Data})=1$.

The following discussion provides example implementations for combining model probabilities to define GP. Let GP be a discrete probability distribution over E, such that $GP(E_k)=\Sigma_j P(M_j|M_j.\text{Parent.Data})$, where $M_j.\text{Element}=E_k$. It is not necessary to normalize this distribution, as the total probability assigned to all models already equals 1. Hence, models with a higher probability provide a stronger "vote" for the UI element that they infer gaze to be resting on. Using GP, the at least one processor may determine the most probable UI element, and may determine whether the gaze confidence threshold is met, as discussed further below.

If the gaze confidence threshold is not met, or if gaze confidence has been trending downward, optimization of models may be performed to reduce the entropy of GP and increase gaze confidence. After optimization is performed, model probabilities and GP must be recomputed. Since it cannot be guaranteed that optimization will improve GP, the original models and GP should be retained until they are improved upon. According to one approach, the at least one processor may discard improbable models to reduce the time complexity of subsequent optimizations, and reduce noise prior to computing GP. According to another approach, the at least one processor may evict inaccurate calibration points from parent models. The at least one processor may then refit their transforms to achieve better transform accuracy and more meaningful probability values.

The following discussion provides example implementations for retaining the most probable models. Just as the number of calibration points in a model must be bounded ($N_{Max}$), the number of models must also be bounded ($M_{Max}$), to allow the system to keep up with gaze input from the glint detection module. Suitable values for $M_{Max}$ (e.g., 5, 7, 10) may be determined via experimentation, for example. The system may ensure that this value is safely smaller than a value that would begin to cause a slowdown. Additionally, in at least some implementations a developer configuration option may be provided to allow selective adjustment of $M_{Max}$.

In operation, the at least one processor may sort the models in descending order of probability, and retain the $M_{Max}$ models with the highest probability. It is possible that fewer than $M_{Max}$ models have significant probability. In this case, fewer than $M_{Max}$ models may be retained. For example, a probability threshold may be defined, where models with probability lower than this threshold (e.g., 0.1) are not retained.

After the most probable models $M_1, \ldots, M_K$ have been retained, the at least one processor may evict calibration point(s) from each model $M_i$ if necessary to accommodate the most recent calibration point, and/or to optimize the model. The at least one processor may then refit $T_i$ to $M_i$ for each model, and renormalize model probabilities to account for the probability that was lost when models were discarded, according to the following equation for all models:

$$P(M_i|M_i.\text{Parent}.\text{Data}) = (P(M_i|M_i.\text{Parent}.\text{Data})/\Sigma_j P(M_j|M_j.\text{Parent}.\text{Data}))$$

The at least one processor may then store each model's probability value, which becomes the prior probability of each of the model's child models.

The following discussion provides example implementations for gaze confidence and UI element highlighting. When gaze is resting, GP may be computed as described above. It is straightforward to find the $E_k$ with the highest probability, and compare this probability to the probabilities of the other UI elements. $E_1$ may be defined as the highest-probability UI element and $E_2$ be the second-highest-probability UI element as defined by GP. The gaze confidence threshold is met when the probability that gaze is resting on $E_1$ is greater than or equal to the gaze confidence threshold times the probability that gaze is resting on $E_2$. In at least some implementations, the gaze confidence threshold may have a default value of 2.0 (i.e., gaze confidence=2*100/(numElements+1)), for example, and may be selectively adjustable.

This simple approach was chosen over more complex methods because even with worst-case threshold clearance and entropy, probability distributions are intuitively acceptable from a confidence perspective, as long as the number of UI elements is reasonably small. The list below shows exemplary gaze confidence thresholds on a 100% scale for displays having between 2 and 10 UI elements displayed thereon.

2 UI elements; gaze confidence threshold is 66;
3 UI elements; gaze confidence threshold is 50;
4 UI elements; gaze confidence threshold is 40;
5 UI elements; gaze confidence threshold is 33.3;
6 UI elements; gaze confidence threshold is 29;
7 UI elements; gaze confidence threshold is 25;
8 UI elements; gaze confidence threshold is 22;
9 UI elements; gaze confidence threshold is 20; and
10 UI elements; gaze confidence threshold is 18.

If the gaze confidence threshold is met, the at least one processor may assume that the user is gazing at the highest-probability UI element. If the WHUD is currently in calibration recovery mode, the at least one processor may exit this mode, which enables UI element highlighting. If the UI element is selectable, the at least one processor may cause the UI element to be highlighted. Otherwise, if not in calibration recovery mode, the processor may enter calibration recovery mode, which disables UI element highlighting.

The following discussion provides example implementations for a calibration recovery mode and a reading mode for a WHUD.

When gaze confidence is below the gaze confidence threshold (and the user makes a selection), the dynamic calibration system may enter calibration recovery mode. In this mode, UI element highlighting is disabled until the system exits this mode, which cues the user to shift gaze between UI elements to facilitate calibration recovery. In this mode, the system's goal is to reach the gaze confidence threshold as quickly as possible. Models are extended and evaluated as discussed above, and although the probabilities of these models will be low initially, the probabilities of some models will quickly climb as gaze is shifted between UI elements. Since the user is expected to shift gaze when the dynamic calibration system is in this mode, the user's gaze sequence may be unpredictable and atypical. Therefore, $g(M_i.\text{Parent}.\text{Data}, M_i.\text{Element})$ should unconditionally return 1 when the system is in this mode, or model probabilities may become too small, preventing the gaze confidence threshold from being met.

In at least some implementations, the at least one processor may reduce N to $N_{Min}$ (e.g., 3 for affine transform) during calibration recovery mode. This will eliminate the oldest calibration points from all models and immediately update model transforms, and will allow each incoming calibration point to have a more immediate and significant impact on its model's transform.

The at least one processor may also loosen model retention behavior. For example, the at least one processor may disable the probability threshold that models usually must exceed to be retained, ensuring that $M_{Max}$ models are retained each time gaze is resting. The at least one processor may also allow additional (or all) models to be retained (exceeding $M_{Max}$) every other time gaze is resting. When gaze rests again, the at least one processor may prune the models as usual.

When gaze is resting, at least one model will generally make the correct inference, but it is not guaranteed that this model will have significant probability relative to the other models. This is because this model's existing calibration points and transform may no longer be accurate due to movement of the support frame. However, retaining this model allows the model's correctly inferred calibration point to improve the accuracy of its transform. Since one of this model's child models is guaranteed to make the correct inference the next time gaze is resting, this child model may be assigned a higher probability due to the improved accuracy of its parent model's transform, and hence has a higher probability of being retained. If this occurred, convergence may be likely, as this child model's transform would be fitted to two recent, correct calibration points, and a third calibration point of unknown accuracy, and one of this model's children is guaranteed to correctly infer the next calibration point.

Therefore, retaining additional models increases the probability that the model(s) that have made the correct inference are retained, which increases the probability of calibration recovery. Retaining a significant number of models (or all models) every other time gaze is rested may greatly speed the convergence of calibration recovery. However, exceeding $M_{Max}$ by definition may prevent the system from being able to keep up with input from the glint detection module. But, this may be acceptable in calibration recovery mode, and input from the glint detection module can be handled as needed. In at least some implementations, the at least one processor may perform advanced optimization and selection of models to speed the convergence of calibration recovery In at least some implementations, a reading mode may be implemented that obtains inferred calibration points when the system detects that the user is reading. As an example, the system may detect that the user is reading by detecting that the user is gazing at a UI element that is a known text container. As another example, the system may detect that the user is reading by detecting that the user's gaze is moving in saccades. As another example, the system may detect that the user is reading based on the text content where the saccades should land (in general or for the user), and obtain inferred calibration points. As another example, the system may determine the line of text that is currently being read, and the current reading speed of the user. Such functionality may also be used to support an auto-scrolling feature for sizeable bodies of text.

The various implementations described herein may employ ensemble machine learning methods that make use of and combine different models and machine learning techniques.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Application Publication No. US 2015-0378161 A1, US Patent Application Publication No. 2016-0377866 A1 U.S. Non-Provisional patent application Ser. No. 15/046,234, U.S. Non-Provisional patent application Ser. No. 15/046,254, US Patent Application Publication No. US 2016-0238845 A1, U.S. Non-Provisional patent application Ser. No. 15/145,576, U.S. Non-Provisional patent application Ser. No. 15/145,609, U.S. Non-Provisional patent application Ser. No. 15/147,638, U.S. Non-Provisional patent application Ser. No. 15/145,583, U.S. Non-Provisional patent application Ser. No. 15/256,148, U.S. Non-Provisional patent application Ser. No. 15/167,458, U.S. Non-Provisional patent application Ser. No. 15/167,472, U.S. Non-Provisional patent application Ser. No. 15/167,484, U.S. Provisional Patent Application Ser. No. 62/271,135, U.S. Non-Provisional patent application Ser. No. 15/331,204, US Patent Application Publication No. US 2014-0198034 A1, US Patent Application Publication No. US 2014-0198035 A1, U.S. Non-Provisional patent application Ser. No. 15/282,535, U.S. Provisional Patent Application Ser. No. 62/268,892, U.S. Provisional Patent Application Ser. No. 62/322,128, U.S. Provisional Patent Application Ser. No. 62/428,320, and U.S. Provisional Patent Application Ser. No. 62/533,463, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operating a wearable heads-up display device (WHUD) comprising a display and a glint detection module, the method comprising:
   obtaining, by at least one processor, one or more calibration point models each comprising a plurality of calibration points, each calibration point comprising:
      a glint space point in a glint space captured by the glint detection module, the glint space point representative of a position of an eye of a user of the WHUD; and
      a display space point in a display space of the display, the display space point representative of a location on the display at which a gaze of the user is inferred to be resting when the glint space point is captured by the glint detection module;
   generating, by the at least one processor, a transform from the glint space to the display space for each of the one or more calibration point models;
   determining, by the at least one processor, a user gaze location in the display space using received glint information and the generated transform;
   from time-to-time during regular operation of the WHUD by the user,
      generating, by the at least one processor, at least one additional calibration point;
      adding, by the at least one processor, the additional calibration point to at least one of the calibration point models to generate one or more child calibration point models;
      generating, by the at least one processor, a transform for each of the one or more child calibration point models; and
      determining, by the at least one processor, the user gaze location in the display space using at least one glint space point received from the glint detection module and at least one transform of the one or more child calibration point models.

2. The method of claim 1 wherein generating at least one additional calibration point comprises generating an additional inferred calibration point comprising:
   a glint space point received from the glint detection module; and
   a display space point that corresponds to a location in the display space of a user interface (UI) element determined to be the user gaze location.

3. The method of claim 1 wherein generating at least one additional calibration point comprises generating an additional inferred calibration point for each of a plurality of user interface (UI) elements displayed on the display, each inferred calibration point comprising:
- a glint space point received from the glint detection module; and
- a display space point that corresponds to a location in the display space of one of the plurality of UI elements.

4. The method of claim 1 wherein generating at least one additional calibration point comprises generating at least one additional selected calibration point comprising:
- a glint space point received from the glint detection module; and
- a display space point that is a location of a user interface (UI) element on the display selected by the user during regular operation of the WHUD.

5. The method of claim 4 wherein determining the user gaze location in the display space using at least one glint space point received from the glint detection module and at least one transform comprises determining the user gaze location in the display space using at least one glint space point received from the glint detection module and the one or more child calibration point models that include the at least one additional selected calibration point.

6. The method of claim 1 wherein generating the transform comprises generating an affine transform from the glint space to the display space.

7. The method of claim 1 wherein generating the transform comprises solving a matrix utilizing at least one of a QR decomposition method or singular value decomposition method.

8. The method of claim 1, further comprising:
- from time-to-time during regular operation of the WHUD by the user, evicting at least one calibration point from a calibration point model.

9. The method of claim 8 wherein evicting at least one calibration point from the calibration point model comprises evicting an oldest calibration point from the calibration point model.

10. The method of claim 8 wherein evicting at least one calibration point from the calibration point model comprises evicting a calibration point based on at least one of the locations of calibration points in the calibration point model or the times at which the calibration points in the calibration point model were obtained.

11. The method of claim 1 wherein obtaining one or more calibration point models each comprising a plurality of calibration points comprises:
- populating, by the at least one processor, the display of the WHUD with a plurality of user interface (UI) elements;
- for each of the plurality of UI elements,
  - receiving, by the at least one processor, a selection of the UI element by the user; and
  - receiving, by the at least one processor, a glint space point from the glint detection module obtained concurrently with the selection of the UI element by the user; and
  - generating, by the at least one processor, a calibration point that comprises the received glint space point and a display space point representative of the location of the UI element on the display of the WHUD.

12. The method of claim 11 wherein populating the display of the WHUD with the plurality of UI elements comprises populating the display with the plurality of UI elements one at a time in a sequential order.

13. The method of claim 1 wherein obtaining one or more calibration point models each comprising a plurality of calibration points comprises:
- causing, by the at least one processor, four user interface (UI) elements to be sequentially displayed on the display, each of the four UI elements sequentially displayed in a different one of four corners of the display; and
- obtaining, by the at least one processor, four calibration points that each correspond to a respective one of the UI elements, each calibration point comprising a display point the display space and a glint space point in the glint space.

14. The method of claim 1 obtaining one or more calibration point models each comprising a plurality of calibration points comprises:
- causing, by at least one processor, a user interface (UI) element to move on the display of the WHUD according to a determined pattern; and
- generating, by the at least one processor, a plurality of calibration points as the UI element moves on the display, each calibration point comprises:
  - a glint space point in the glint space captured by the glint detection module; and
  - a display space point in the display space, the display space point representative of a location on the display of the moving UI element when the corresponding glint space point is captured by the glint detection module.

15. The method of claim 14 wherein causing the UI element to move on the display of the WHUD according to the determined pattern comprises causing the UI element to move on the display of the WHUD according to a rectangular-shaped pattern in a first direction and a second direction, the second direction opposite the first direction.

16. The method of claim 1, further comprising:
- receiving, by the at least one processor, at least one auxiliary sensor value from at least one auxiliary sensor during regular operation of the WHUD by the user; and
- optimizing, by the at least one processor, a transform of at least one calibration point model based at least in part on the received at least one auxiliary sensor value.

17. The method of claim 16 wherein receiving at least one auxiliary sensor value comprises obtaining at least one auxiliary sensor value from at least one of a proximity sensor, a gyroscope sensor or an accelerometer.

18. The method of claim 1, further comprising:
- receiving, by the at least one processor, a plurality of calibration points, each calibration point comprising:
  - a glint space point;
  - a display space point; and
  - at least one auxiliary sensor value from at least one auxiliary sensor obtained concurrently with the glint space point and the display space point; and
- training a machine learning model utilizing the plurality of calibration points, or data derived therefrom, the trained machine learning model receives as inputs at least one current auxiliary sensor value and outputs at least one of a set of calibration points or transform parameters.

19. The method of claim 18, further comprising:
- optimizing, by the at least one processor, at least one transform utilizing the trained machine learning model.

20. The method of claim 18 wherein receiving a plurality of calibration points comprises receiving a plurality of calibration points from the WHUD and from a population of WHUDs operated by a population of users.

* * * * *